United States Patent
Lee et al.

(10) Patent No.: US 9,992,802 B2
(45) Date of Patent: Jun. 5, 2018

(54) METHOD FOR PERFORMING CONNECTING OPERATION WITH MULTIPLE COMMUNICATION SYSTEMS IN NETWORK INCLUDING MULTIPLE COMMUNICATION SYSTEMS INTERWORKING WITH EACH OTHER, AND APPARATUS FOR SAME

(71) Applicant: LG ELECTRONICS INC., Seoul (KR)

(72) Inventors: Eunjong Lee, Seoul (KR); Hyunsoo Ko, Seoul (KR); Hyeyoung Choi, Seoul (KR); Genebeck Hahn, Seoul (KR); Heejeong Cho, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 221 days.

(21) Appl. No.: 14/785,573

(22) PCT Filed: Apr. 18, 2014

(86) PCT No.: PCT/KR2014/003414
§ 371 (c)(1),
(2) Date: Oct. 19, 2015

(87) PCT Pub. No.: WO2014/171786
PCT Pub. Date: Oct. 23, 2014

(65) Prior Publication Data
US 2016/0135231 A1    May 12, 2016

Related U.S. Application Data

(60) Provisional application No. 61/813,656, filed on Apr. 19, 2013.

(51) Int. Cl.
*H04W 76/02* (2009.01)
*H04W 68/12* (2009.01)
(Continued)

(52) U.S. Cl.
CPC ............. *H04W 76/02* (2013.01); *H04W 4/06* (2013.01); *H04W 52/0216* (2013.01);
(Continued)

(58) Field of Classification Search
CPC ............. H04W 76/02; H04W 52/0235; H04W 72/042; H04W 68/005; H04W 76/046;
(Continued)

(56) References Cited

U.S. PATENT DOCUMENTS

2011/0249571 A1    10/2011    Das et al.
2013/0029639 A1    1/2013    Lee et al.
(Continued)

FOREIGN PATENT DOCUMENTS

KR    10-2004-0053858 A    6/2004
KR    10-2013-0014442 A    2/2013
(Continued)

*Primary Examiner* — Jackie Zuniga Abad
(74) *Attorney, Agent, or Firm* — Birch, Stewart, Kolasch & Birch, LLP

(57) ABSTRACT

A method performed by a user equipment (UE) that operates according to a first indicator and a second indicator is provided. When the UE is in a radio resource control (RRC) connected state with a first communication system and is in a state of idle mode with a second communication system, the UE receives a first message including the first indicator and the second indicator from the first communication system. The first indicator instructs the UE to perform association processes with a base station of the second communication system. The second indicator instructs the UE to operate in a power saving mode with the base station of the second communication system. After the UE performs
(Continued)

the association processes, the UE switches to an RRC-idle mode state with the first communication system and enters the power saving mode from the idle mode with the second communication system.

10 Claims, 16 Drawing Sheets

(51) Int. Cl.
    *H04W 76/00* (2018.01)
    *H04W 52/02* (2009.01)
    *H04W 4/06* (2009.01)
    *H04W 68/00* (2009.01)
    *H04W 72/04* (2009.01)
    *H04W 76/04* (2009.01)

(52) U.S. Cl.
    CPC ... *H04W 52/0219* (2013.01); *H04W 52/0235* (2013.01); *H04W 68/005* (2013.01); *H04W 68/12* (2013.01); *H04W 72/042* (2013.01); *H04W 76/00* (2013.01); *H04W 76/046* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/24* (2018.01)

(58) Field of Classification Search
    CPC ............... H04W 4/06; H04W 52/0219; H04W 52/0216; H04W 68/12
    See application file for complete search history.

(56) References Cited

U.S. PATENT DOCUMENTS

2014/0323180 A1* 10/2014 Uusitalo ............... H04W 88/06
    455/553.1
2014/0378172 A1* 12/2014 Lim ....................... H04W 68/12
    455/458

FOREIGN PATENT DOCUMENTS

| | | |
|---|---|---|
| KR | 10-2013-0016328 A | 2/2013 |
| WO | WO 2012/074878 A2 | 6/2012 |
| WO | WO 2012/135994 A1 | 10/2012 |

* cited by examiner

METHOD FOR PERFORMING CONNECTING OPERATION WITH MULTIPLE COMMUNICATION SYSTEMS IN NETWORK INCLUDING MULTIPLE COMMUNICATION SYSTEMS INTERWORKING WITH EACH OTHER, AND APPARATUS FOR SAME

CROSS REFERENCE TO RELATED APPLICATIONS

This application is the National Phase of PCT International Application No. PCT/KR2014/003414, filed on Apr. 18, 2014, which claims priority under 35 U.S.C. 119(e) to U.S. Provisional Application No. 61/813,656, filed on Apr. 19, 2013, all of which are hereby expressly incorporated by reference into the present application.

FIELD OF THE INVENTION

The present invention relates to wireless communication and, more particularly, to a method for performing a connecting operation with multiple communication systems in a network including the multiple communication systems interworking with each other and an apparatus for the same.

BACKGROUND ART

There is a multi-RAT user equipment (UE) having capability in which the multi-RAT UE can access two or more radio access technologies (RATs). In order to access a specific RAT, connection to a specific RAT can be established on the basis of a UE request, and data transmission/reception can be achieved on the basis of the UE request. However, although the multi-RAT UE has the capability to access two or more RATs, the multi-RAT UE cannot simultaneously access multiple RATs. In other words, although a current UE has multi-RAT capability, the UE cannot simultaneously transmit and receive data through different RATs.

Since the related art multi-RAT technology does not required interworking between a wireless local area network (LAN) and a cellular network, there lies a problem in that the overall system efficiency is poor. Moreover, even if the user equipment (UE) is available for simultaneous access (or connection) to the Multiple RAT, by supporting only flow mobility/IP-flow mapping at the network level without any control in the wireless level, simultaneous connection (or access) to the Multiple RAT was made available.

However, such related art technology has its limitations in enhancing the overall network efficiency, since the network situation is not accurately understood, and since the RAT selected is focused mainly on the user equipment (UE). Most particularly, as the access of the user equipment to multiple communication systems has become available, although methods for allowing the user equipment to efficiently perform data shifting from one specific communication system to another communication system have become required, such research has not yet been carried out.

DETAILED DESCRIPTION OF THE INVENTION

Technical Objects

A technical object that is to be achieved in the present invention is to provide a method for performing a connecting operation with multiple communication systems in a network including the multiple communication systems interworking with each other.

Another technical object that is to be achieved in the present invention is to provide a user equipment for performing a connecting operation with multiple communication systems in a network including the multiple communication systems interworking with each other.

The technical objects of the present invention will not be limited only to the objects described above, and any other additional technical objects that have not been mentioned in the description will become apparent to those having ordinary skills in the art upon the following description of the present application.

Technical Solutions

In order to achieve the above-described technical object, a method for performing connection operations with a plurality of communication systems by a user equipment in a network including the a plurality of communication systems interworking with each other includes transmitting, to an interworking entity of a first communication system, a result of scanning a base station of a second communication system when the user equipment is radio resource control (RRC)-connected state with the first communication system and is a state of idle mode with the second communication system; receiving a first message including a first indicator and a second indicator from the interworking entity of the first communication system, the first indicator instructing the user equipment to perform an association process with the base station of the second communication system and the second indicator instructing the user equipment to operate in a power saving mode with the second communication system; performing the association process with the base station of the second communication system based on the first indicator of the first message; after performing the association process, switching into an RRC-idle mode state with the first communication system and entering the power saving mode from the idle mode with the second communication system based on the second indicator of the first message; and receiving, from a base station of the first communication system, a second communication system paging message through a paging channel of the first communication system.

The method may further include a step of turning-on a mode of the second communication system based upon a reception of the second communication system paging message, receiving a periodic broadcast signal from the base station of the second communication system, and maintaining an awake state with the second communication system. The method may also further include, after completing the procedure related to awake, operating in a connected state with the second communication system and maintaining an idle mode state with the first communication system. The method may also further include receiving downlink data of the first communication system from the base station of the second communication system. Herein, an interworking entity of the first communication system may correspond to at least one eNode B, MME (Mobility Management Entity), or IWME (InterWorking Management Entity). And, in case the user equipment enters the power saving mode, before receiving the second communication system paging message from the base station of the first communication system, the user equipment does not awake even in a listening interval. Herein, the first communication system may correspond to a cellular communication system, and the second communication system may correspond to a wireless LAN communication system.

In order to achieve the other above-described technical object, a user equipment for performing connection operations with a plurality of communication systems in a network including the a plurality of communication systems interworking with each other may include a transmitter configured to transmit, to an interworking entity of a first communication system, a result of scanning a base station of a second communication system when the user equipment is radio resource control (RRC)-connected with the first communication system and is in a state of idle mode with the second communication system; a receiver configured to receive a first message including a first indicator and a second indicator from the interworking entity of the first communication system, the first indicator instructing the user equipment to perform an association process with the base station of the second communication system and the second indicator instructing the user equipment to operate in a power saving mode with the second communication system; and a processor configured to perform the association process with the base station of the second communication system based on the first indicator of the first message, to maintain an RRC idle mode state with the first communication system and to enter the power saving mode from the idle mode with the second communication system based on the second indicator of the first message, wherein the receiver may be configured to receive, from a base station of the first communication system, a second communication system paging message through a paging channel of the first communication system.

The processor may be controlled to turn-on a mode of the second communication system based upon a reception of the second communication system paging message, to receive a periodic broadcast signal from the base station of the second communication system, and to maintain an awake state with the second communication system. The processor may also be controlled to, after completing the procedure related to awake, operate in a connected state with the second communication system and to maintain an idle mode state with the first communication system. The receiver may be configured to receive downlink data of the first communication system from the base station of the second communication system. And, an interworking entity of the first communication system may correspond to at least one eNode B, MME (Mobility Management Entity), or IWME (Inter-Working Management Entity). In case the user equipment enters the power saving mode, before receiving the second communication system paging message from the base station of the first communication system, the processor may be controlled not to awake the user equipment even in a listening interval. And, herein, the first communication system may correspond to a cellular communication system, and the second communication system may correspond to a wireless LAN communication system.

Advantageous Effects

In a wideband wireless communication system according to the present invention, in order to allow the user equipment to efficiently use the WLAN through a control of the cellular network, the idle mode user equipment may send instructions so that data can be received via WLAN. Most particularly, it is proposed herein that, in case the downlink data arrive at the cellular network, the user equipment is capable of efficiently shifting data to WiFi by using minimum power through a broadcast channel (broadcast or paging channel) of the cellular network.

The effects that may be gained from the embodiment of the present invention will not be limited only to the effects described above. Accordingly, other effects of the present application, which are not mentioned herein, will become apparent to those having ordinary skills in the art.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the technical principle of the invention.

BEST MODE FOR CARRYING OUT THE PRESENT INVENTION

Figure 1:
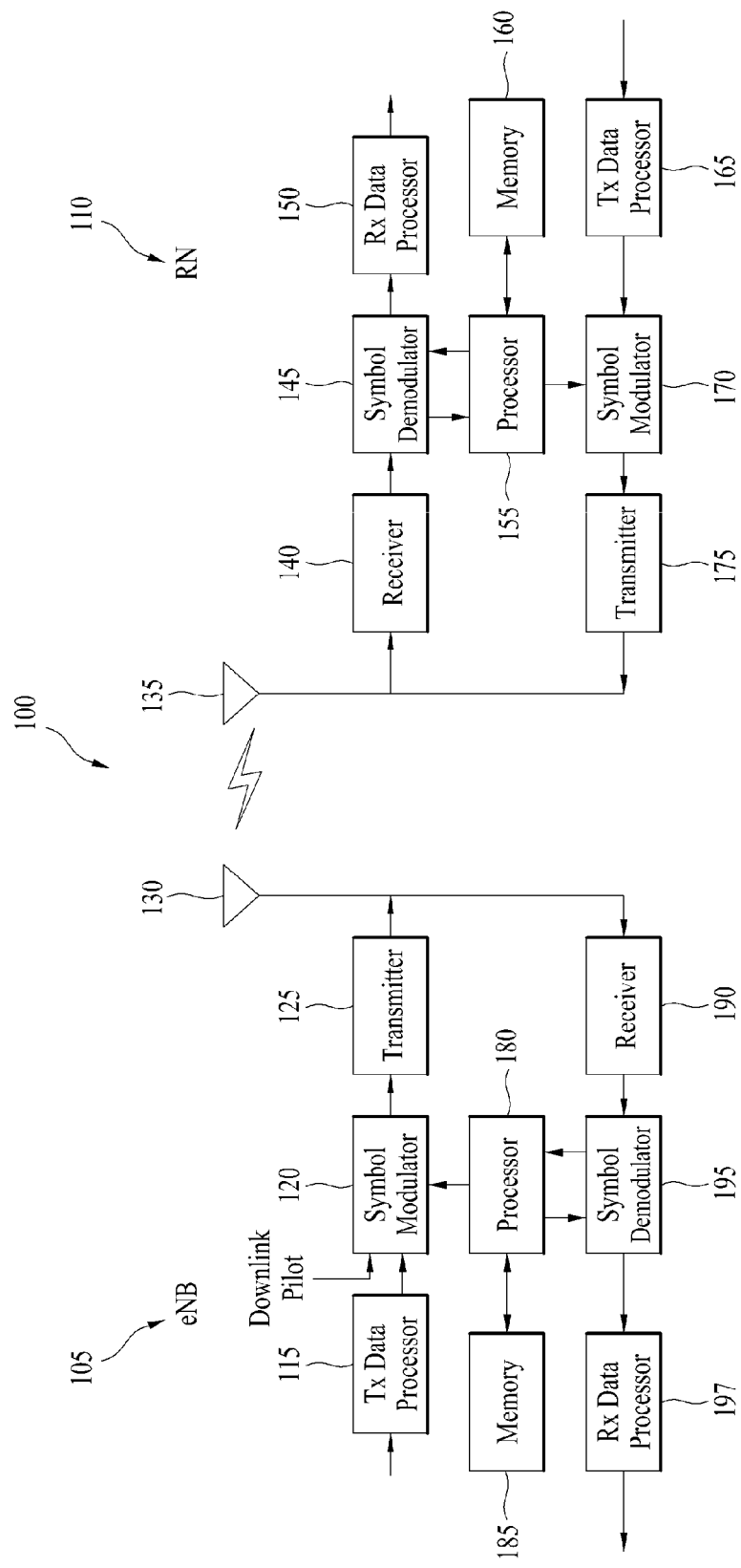
FIG. 1 illustrates a block diagram for configurations of a base station (105) and a user equipment (110) in a wireless communication system (100).

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station (105) and a user equipment (110) in a wireless communication system (100).

Although one base station (105) and one user equipment (110) (D2D user equipment included) are shown in the drawing to schematically represent a wireless communication system (100), the wireless communication system (100) may include at least one base station and/or at least one user equipment.

Referring to FIG. 1, a base station (105) may include a transmitted (Tx) data processor (115), a symbol modulator (120), a transmitter (125), a transceiving antenna (130), a processor (180), a memory (185), a receiver (190), a symbol demodulator (195) and a received data processor (197). And, a user equipment (110) may include a transmitted (Tx) data processor (165), a symbol modulator (170), a transmitter (175), a transceiving antenna (135), a processor (155), a memory (160), a receiver (140), a symbol demodulator (155) and a received data processor (150). Although the base station/user equipment (105)/(110) includes one antenna (130)/(135) in the drawing, each of the base station (105) and the user equipment (110) includes a plurality of antennas. Therefore, each of the base station (105) and the user equipment (110) of the present invention supports an MIMO (multiple input multiple output) system. And, the base station (105) according to the present invention may support both SU-MIMO (single user-MIMO) and MU-MIMO (multi user-MIMO) systems.

In downlink, the transmitted data processor (115) receives traffic data, codes the received traffic data by formatting the received traffic data, interleaves the coded traffic data, modulates (or symbol maps) the interleaved data, and then provides modulated symbols (data symbols). The symbol modulator (120) provides a stream of symbols by receiving and processing the data symbols and pilot symbols.

The symbol modulator (120) multiplexes the data and pilot symbols together and then transmits the multiplexed symbols to the transmitter (125). In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter (125) receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna (130).

In the configuration of the user equipment (110), the receiving antenna (135) receives the downlink signal from the base station and then provides the received signal to the receiver (140). The receiver (140) adjusts the received signal (e.g., filtering, amplification and frequency downconverting), digitizes the adjusted signal, and then obtains samples. The symbol demodulator (145) demodulates the received pilot symbols and then provides them to the processor (155) for channel estimation.

The symbol demodulator (145) receives a frequency response estimated value for downlink from the processor (155), performs data demodulation on the received data symbols, obtains data symbol estimated values (i.e., estimated values of the transmitted data symbols), and then provides the data symbols estimated values to the received (Rx) data processor (150). The received data processor (150) reconstructs the transmitted traffic data by performing demodulation (i.e., symbol demapping, deinterleaving and decoding) on the data symbol estimated values.

The processing by the symbol demodulator (145) and the processing by the received data processor (150) are complementary to the processing by the symbol modulator (120) and the processing by the transmitted data processor (115) in the base station (105), respectively.

In the user equipment (110) in uplink, the transmitted data processor (165) processes the traffic data and then provides data symbols. The symbol modulator (170) receives the data symbols, multiplexes the received data symbols, performs modulation on the multiplexed symbols, and then provides a stream of the symbols to the transmitter (175). The transmitter (175) receives the stream of the symbols, processes the received stream, and generates an uplink signal. This uplink signal is then transmitted to the base station (105) via the antenna (135).

In the base station (105), the uplink signal is received from the user equipment (110) via the antenna (130). The receiver (190) processes the received uplink signal and then obtains samples. Subsequently, the symbol demodulator (195) processes the samples and then provides pilot symbols received in uplink and a data symbol estimated value. The received data processor (197) processes the data symbol estimated value and then reconstructs the traffic data transmitted from the user equipment (110).

The processor (155, 180) of the user equipment/base station (110)/(105) directs operations (e.g., control, adjustment, management, etc.) of the user equipment/base station (110)/(105). The processor (155, 180) may be connected to the memory unit (160, 185) configured to store program codes and data. The memory (160, 185) is connected to the processor (155, 180) to store operating systems, applications and general files.

The processor (155, 180) may be called one of a controller, a microcontroller, a microprocessor, a microcomputer and the like. And, the processor (155, 180) may be implemented using hardware, firmware, software and/or any combinations thereof. In the implementation by hardware, the processor (155, 180) may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor (155, 180) or saved in the memory (160, 185) to be driven by the processor (155, 180).

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor (155, 180) of the user equipment/base station performs an operation of processing signals and data except a function for the user equipment/base station (110)/(105) to receive or transmit a signal, for clarity, the processors (155) and (180) will not be mentioned in the following description specifically. In the following description, the processor (155, 180) can be regarded as performing a series of operations such as a data processing and the like except a function of receiving or transmitting a signal without being specially mentioned.

Figure 2:
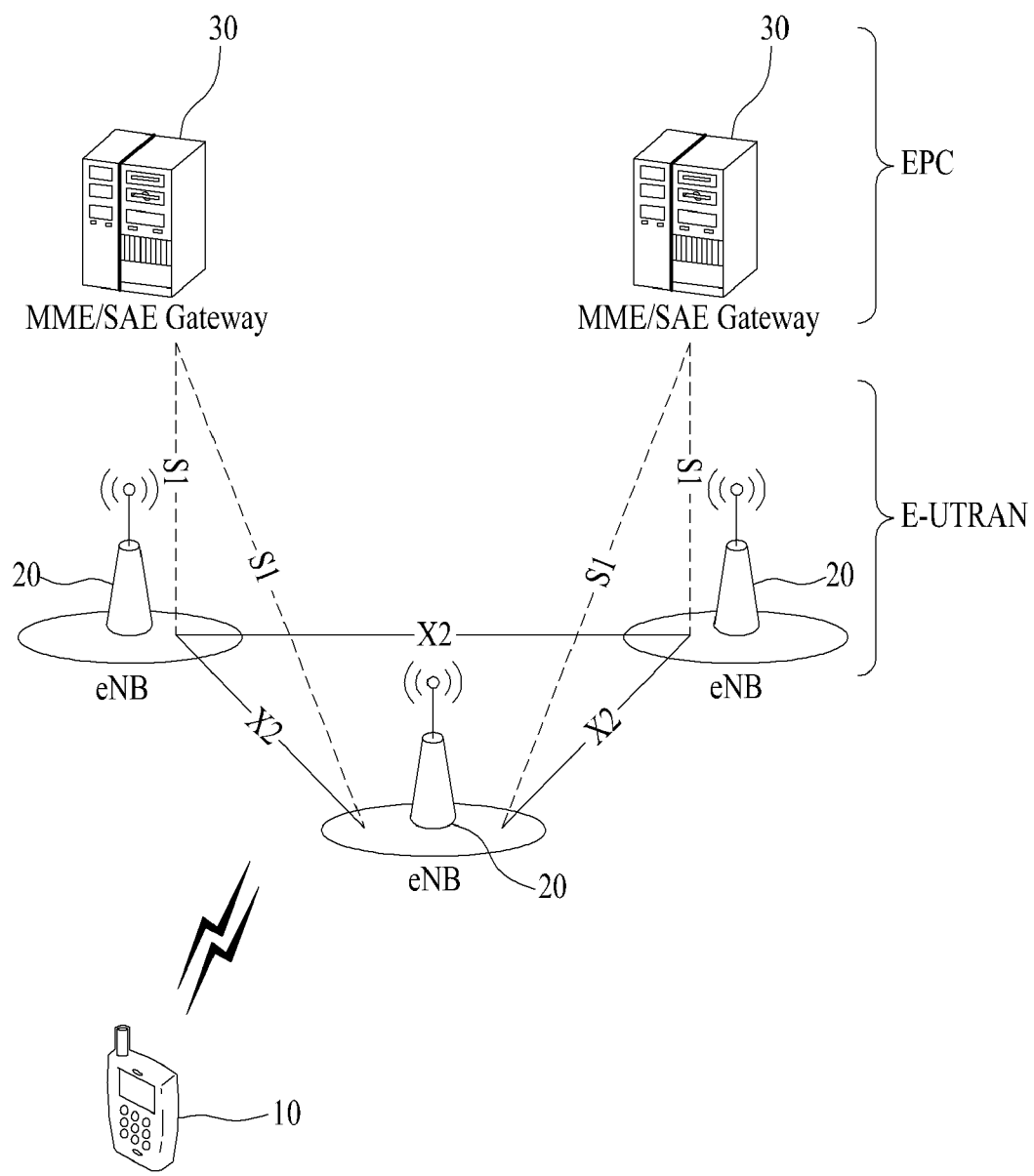
FIG. 2 illustrates a diagram illustrating a structure of a network of an E-UMTS (Evolved Universal Mobile Telecommunications System).

FIG. 2 is a diagram illustrating a structure of a network of an evolved universal mobile telecommunications system (E-UMTS). The E-UMTS may also be referred to as an LTE system. The system may be broadly arranged in order to provide various communication services such as voice ALV packet data and in general, may be configured to be enabled based on various technologies that will be described and disclosed in detail with reference to the following diagrams.

Referring to FIG. 2, the E-UMTS network includes an evolved UMTS terrestrial radio access network (E-UTRAN), an evolved packet core (EPC), and one or more UEs (10). The E-UTRAN includes one or more BSs (20). With regard to the EPC, an MME/SAE gateway (30) provides an end point of a session and a mobility control function to the UE (10). The BS (20) and the MME/SAE gateway (30) may be connected through an S1 interface.

The UE (10) may be an apparatus brought by a user and may also be referred to as a mobile station (MS), a user terminal (UT), a subscriber station (SS), or a wireless apparatus.

In general, the BS (20) is a fixed station that communicates with the UE (10). The BS (20) may also be referred to as an access point (AP) as well as a base station. A BS provides end points of a user plane and a control plane to a UE. In general, the BS is configured to include a transmitter and a processor among other components and to be operated according to various technologies stated in the specification.

A plurality of UEs (10) may be positioned in one cell. In general, one BS (20) is arranged in each cell. An interface for transmission of user traffic or control traffic may be used between the BSs (20). In this specification, "downlink" refers to communication to the UE (10) from the BS (20) and "uplink" refers to communication to the BS (20) from the UE (10).

The MME/SAE gateway (30) provides various functions including distribution of paging messages, security control, idle state mobility control, SAR bearer control, and ciphering and integrity protection of non-access stratum (NAS) signaling to the BSs (20). The SAE gateway (30) provides various functions including termination of U-plan packets for paging reasons and switching of U-plan for supporting UE mobility. For convenience of description, the MME/SAE gateway (30) may also be referred to as a "gateway" in the specification. However, this structure may be interpreted as including both an MME gateway and a SAE gateway.

A plurality of nodes may be connected between the BS (20) and the gateway (30) through an S1 interface. The BSs (20) may be connected to each other through an X2 interface and neighbor BSs may have a meshed network structure with an X2 interface.

Figure 3A:
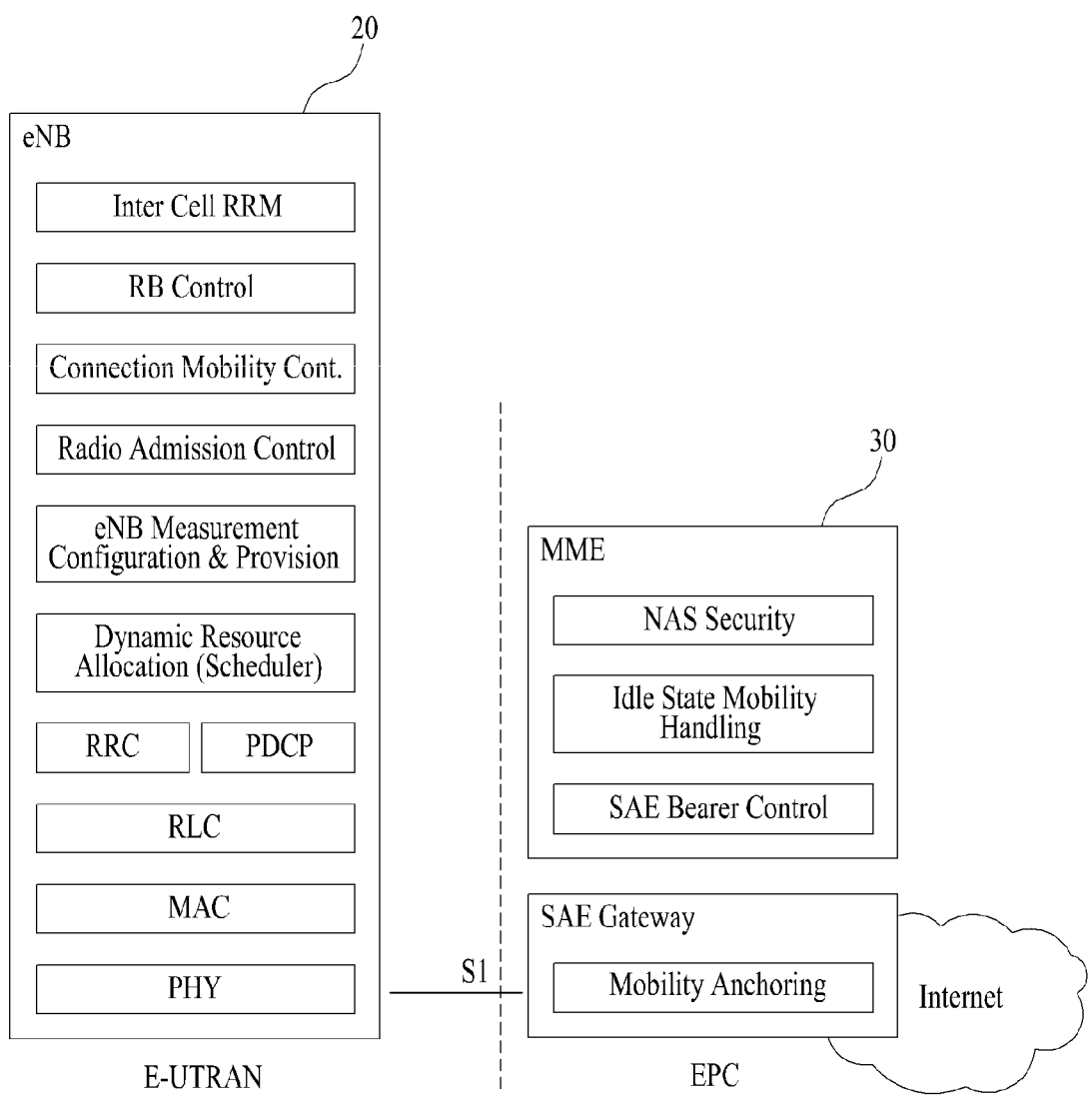
FIG. 3A illustrates a block diagram illustrating general structures of general E-UTRAN and general EPC.

FIG. 3A is a block diagram illustrating general structures of general E-UTRAN and general EPC. Referring to FIG. 3A, the BS (20) may perform functions of selection for the gateway (30), routing toward a gateway while radio resource control (RRC) is enabled, scheduling and transmission of paging messages, scheduling and transmission of broadcasting channel (BCCH) information, dynamic allocation of a resource to the UEs (10) in downlink and uplink, configuration and provisioning of BS measurements, wireless bearer control, radio admission control (RAC), and connection mobility control in an LTE_ACTIVE state.

As described above, in the EPC, the gateway (30) may perform functions of paging origination, LTE_IDLE state control, ciphering of a user plane, SAE barer control, and integrity protection of non-access stratum (NAS) signaling.

Figure 3B:
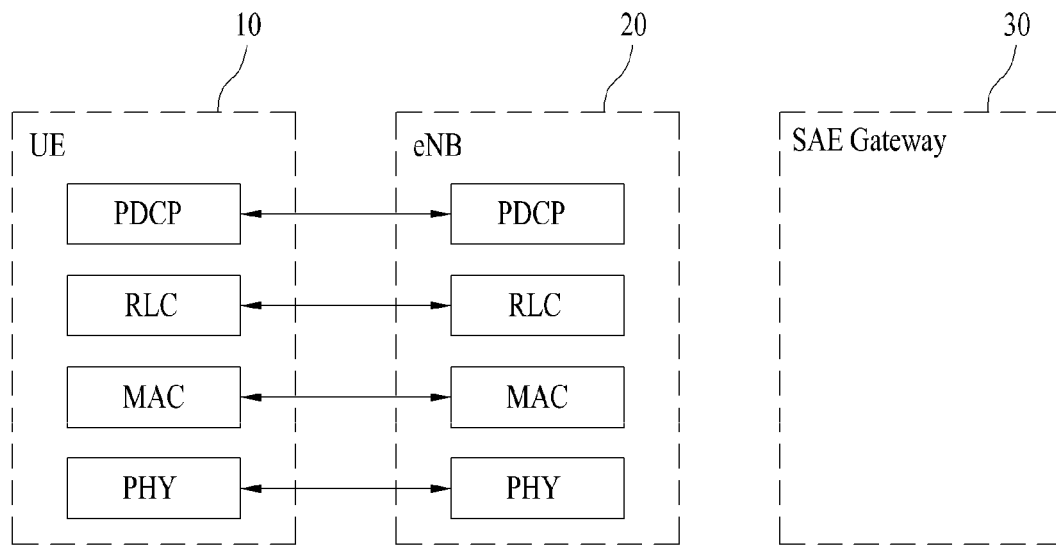
FIG. 3B illustrates a block diagram illustrating a user-plane protocol stack for an E-UMTS network.
Figure 3C:
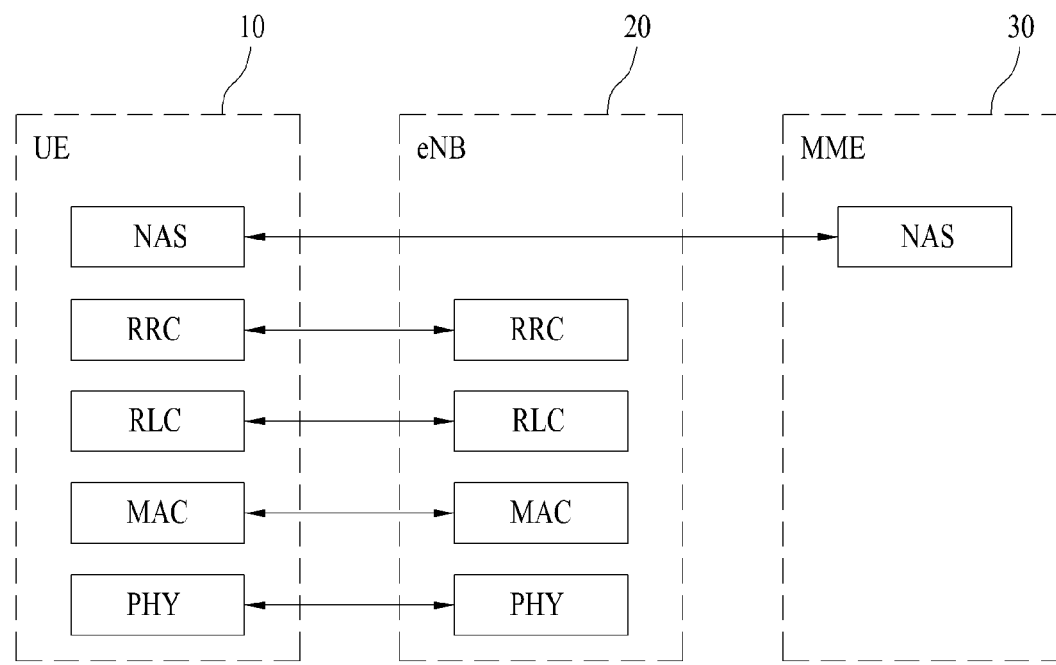
FIG. 3C illustrates a block diagram illustrating a control plane protocol stack for an E-UMTS network.

FIGS. 3B and 3C are block diagrams illustrating user plane protocol and control plane protocol stack for an E-UMTS network. Referring to FIGS. 3B and 3C, protocol layers may be classified into a first layer L1, a second layer L2, and a third layer L3 based on three lower layers of an open system interconnection (OSI) standard model.

The first layer L1 (or a physical layer (PHY)) provides an information transfer service to a higher layer using a physical channel. The PHY is linked to a medium access control (MAC) layer positioned in a higher layer through a transport channel. Data between the MAC layer and the PHY is transmitted through the transport channel. Data between different PHYs, i.e., between PHYs of a transmitter and a receiver (e.g., between PHYs of the UE (10) and the BS (20)) is transmitted through a physical channel 21.

The MAC layer of the second layer L2 provides a service to a radio link control (RLC) layer corresponding to a higher layer through a logical channel. The MAC layer of the second layer L2 supports reliable data transmission. The RLC layer illustrated in FIGS. 3B and 3C is illustrated as the RLC layer is not necessary when MAC RLC functions are implemented and are performed in the MAC layer. Referring to FIG. 3B, a packet data convergence protocol (PDCP) layer of the second layer L2 performs a header compression function of reducing unnecessary control information to efficiently transmit an IP packet such as IPv4 or IPv6 in a radio interface having a narrow bandwidth.

Referring to FIG. 3C, an RRC layer of the third layer L3 corresponding to the lowest of three layers is defined only in the control plane. The RRC layer controls logical channels, transport channels and physical channels with respect to configuration, reconfiguration and release of radio bearers (RBs). Here, RBs refers to a service provided by the second layer L2 for data transmission between a UE and an E-UTRAN.

Referring to FIG. 3B, the RLC and MAC layers (which are terminated in the BS (20) in a network) perform functions such as scheduling, automatic repeat request (ARQ), and hybrid automatic repeat request (HARM). The PDCP layer (which is terminated in the BS (20) in a network) may perform a user plane function such as header compression, integrity protection, and ciphering.

Referring to FIG. 3C, the RLC and MAC layers (which are terminated in the BS (20) in a network) perform the same functions as in a control plane. As exemplified above, the RRC layer (which is terminated in the BS (20) in a network) may perform functions such as broadcasting, paging, RRC connection control, radio bearer (RB) control, mobility function, and UE measurement report and control. A NAS control protocol terminated in the MME gateway (30) in a network may perform a function such as SAE bearer control, authentication, LTE_IDLE mobility handling, paging start in LTE_IDLE, and security control for signaling between gateways and the UE (10).

The NAS control protocol may user three different states: first, LTE_DETACHED state in which there is no RRC entity, second, LTE_IDLE state in which there is no RRC connection but minimum UE information is stored, and third, LTE_ACTIVE state in which RRC connection is established.

The RRC state may be classified into two different states such as RRC_IDLE and RRC_CONNECTED. In the RRC_IDLE state, the UE (10) may receive broadcasting of paging information and system information, specifies discontinuous reception (DRX) configured with NAS, and is allocated with an identifier (ID) for uniquely identifying the UE (10) in a tracking region. In addition, in the RRC_IDLE state, there is no context stored in the BS (20).

In the RRC_IDLE state, the UE (10) specifies a paging DRX cycle. In particular, the UE (10) monitors a paging signal in the case of specific paging of each UE-specific paging DRX cycle.

In the RRC_CONNECTED state, the UE (10) includes E-UTRAN RRC connection and context in the E-UTRAN and transmits and/or receives data to/from an available network (BS). In addition, the UE (10) may report channel quality information and feedback information to the BS (20).

In the RRC_CONNECTED state, the E-UTRAN knows a cell to which the UE (10) belongs. Accordingly, a network may transmit/receive data to/from the UE (10), control mobility (handover) of the UE (10), and perform cell measurement on a neighbor cell.

Figure 4:
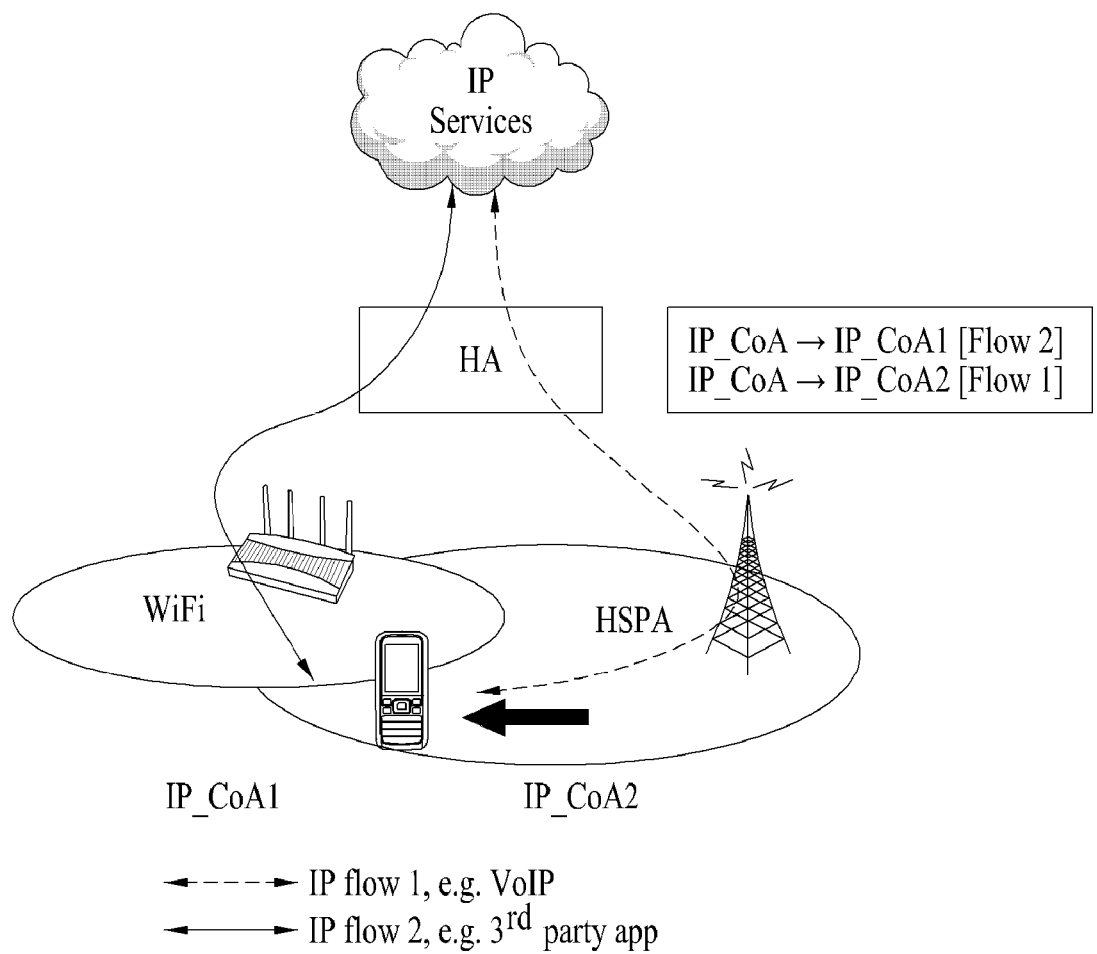
FIG. 4 illustrates an example for describing IP flow based WiFi mobility.

FIG. 4 illustrates an example for describing IP flow based WiFi mobility.

IFOM (IP Flow Mobility): 3G/WiFi Seamless Offload is described in the 3GPP (Rel-10) standard (or specification), and, provided herein are a WLAN offloading technology of DSMIPv6 IP Flow units, DSMIPv6 (Dual Stack Mobile IPv6) user equipment (or terminal) and a solution for simultaneously supporting IPv4 and IPv6. As IPv6 selection has extended due to the diversity in the mobile communication network, and as the mobility support (or mobility capability) has emerged as an essential technology, and since the conventional IPv4 network also requires mobility support, the DSMIPv6 is being selected. Additionally, a client-based MIP technology allowing the user equipment to detect its mobility and to notify this to an agent is also provided. HA correspond to an agent managing the mobility of a mobile node, and a Flow Binding Table and a Binding Cache Table exist herein. In case of using PMIPv6, the IFOM only uses the DSMIPv6 due to the technical problem of having difficulty in performing management in IP flow units.

MAPCON (Multi Access PDN Connectivity): This has a simultaneous (or synchronized) multiple PDN connectivity with other APNs, and, as a Protocol independent technology, PMIPv6, GTP, DSMIPv6 may all be used. Data flows that have been transmitted through one PDN may be entirely moved.

A network structure, wherein multiple communication systems are interworking with one another, will be described.

Figure 5:
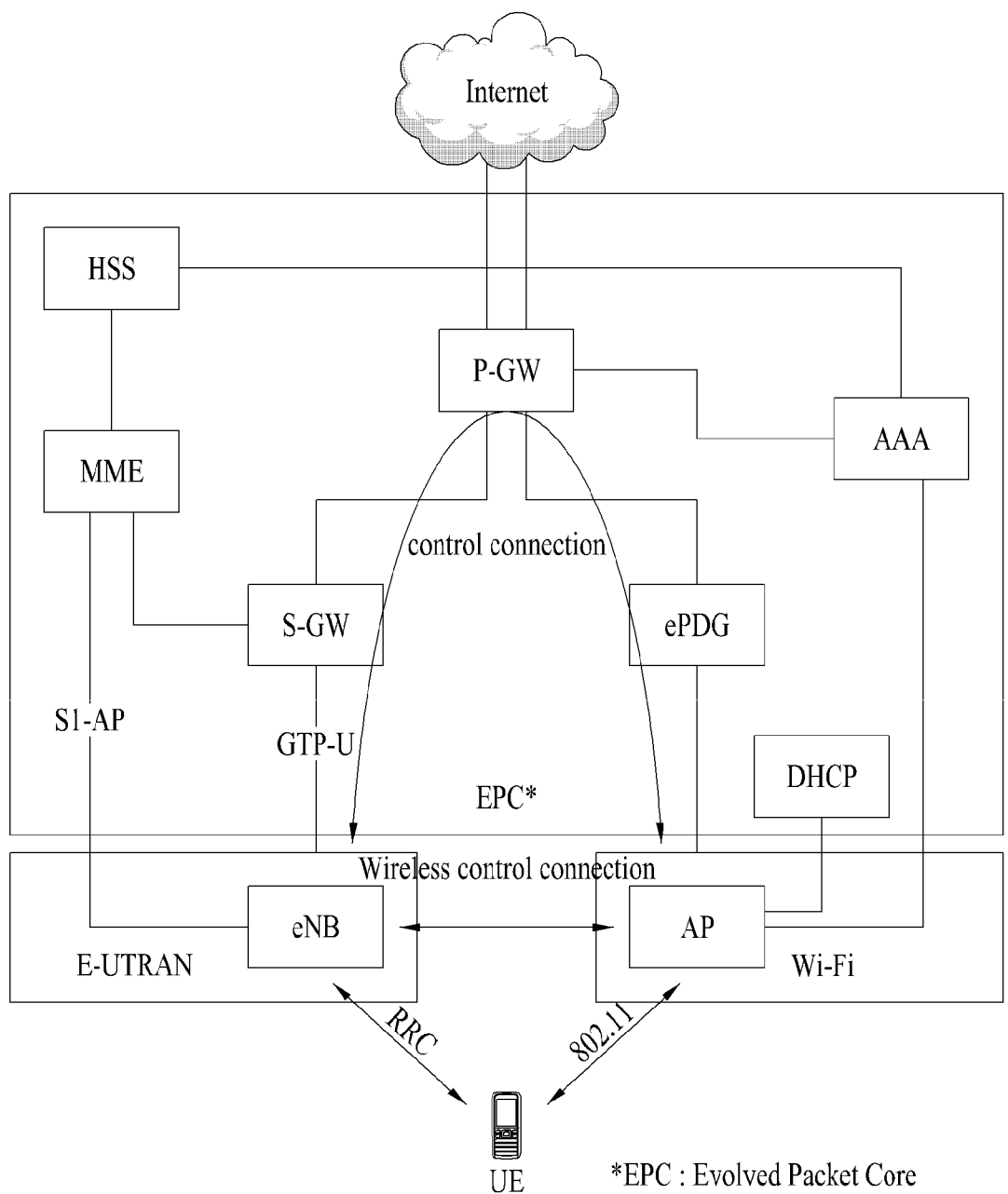
FIG. 5 illustrates an exemplary network structure for describing an interworking structure between a first communication system (e.g., cellular communication system) and a second communication system (e.g., wireless LAN communication system).

FIG. 5 illustrates an exemplary network structure for describing an interworking structure between a first communication system (e.g., cellular communication system) and a second communication system (e.g., wireless LAN communication system).

In the present invention, description will be made by giving a LTE system and a WiFi system as example, wherein the LTE system is an example of a cellular communication system corresponding to the first communication system, and wherein the WiFi system is an example of a wireless LAN communication system corresponding to the second communication system.

In the network structure shown in FIG. 5, a backhaul control connection may be established between an AP and an eNB, or a wireless control connection may be established between an AP and an eNB, through a Backbone network (e.g., P-GW or EPC (Evolved Packet Core)). For a peak throughput and data traffic off-loading, the UE may simultaneously support both of the first communication system (or first communication network) using a first communication method and the second communication system (or second communication network) using a second communication method, through an association between multiple communication networks. Herein, the first communication network or the first communication system may be respectively referred to as a primary network or a primary system, and the second communication network or the second communication system may be respectively referred to as a secondary network or a secondary system. For example, the UE may be configured to simultaneously support LTE (or LTE-A) and WiFi (Short-range communication systems, such as WLAN/802.11). Such user equipment (UE) may also be referred to as a Multi-system capability UE, and so on, in this specification.

In the network structure shown in FIG. 5, the primary system has a wider coverage and may correspond to a network for control information transmission. A WiMAX or LTE (LTE-A) system may be given as an example of the primary system. Meanwhile, the secondary system corresponds to a network having a smaller coverage and may correspond to a system for data transmission. The secondary network may, for example, correspond to a wireless system, such as WLAN or WiFi.

In the present invention description will be given by assuming the following details.

It is assumed that the entity being in charge of interworking corresponds to an entity existing within a cellular network, and it is also assumed that the interworking function is realized in the three types of entities described below.

e-NB—reuse existing entity

MME (Mobility Management Entity)—reuse existing entity

IWME (Interworking Management Entity)—define new entity

The interworking function may be associated with an interworking-related procedure, which may occur between eNB-UE or eNB-AP, and the entity being in charge of interworking stores/manages AP information. The eNB/MME/IWME stores/manages information of the APs existing below (or under) its own coverage.

It is assumed that a connection is configured between an AP, which corresponds to an access point of the secondary system (e.g., WiFi), and a base station (eNB), which corresponds to an access point of the primary system (e.g., cellular communication system, such as a LTE system or WiMAX system), over a wireless link. In the present invention, an AP having a wireless interface with an eNB may also be referred to as an eAP. And, in addition to 802.11 MAC/PHY, the eAP is required to support a LTE protocol stack or a WiMAX protocol stack for the communication the eNB, and the eAP performs a role identical to that of a user equipment with the eNB, and this signifies that the eAP is capable of performing communication with the eNB.

Figure 6:
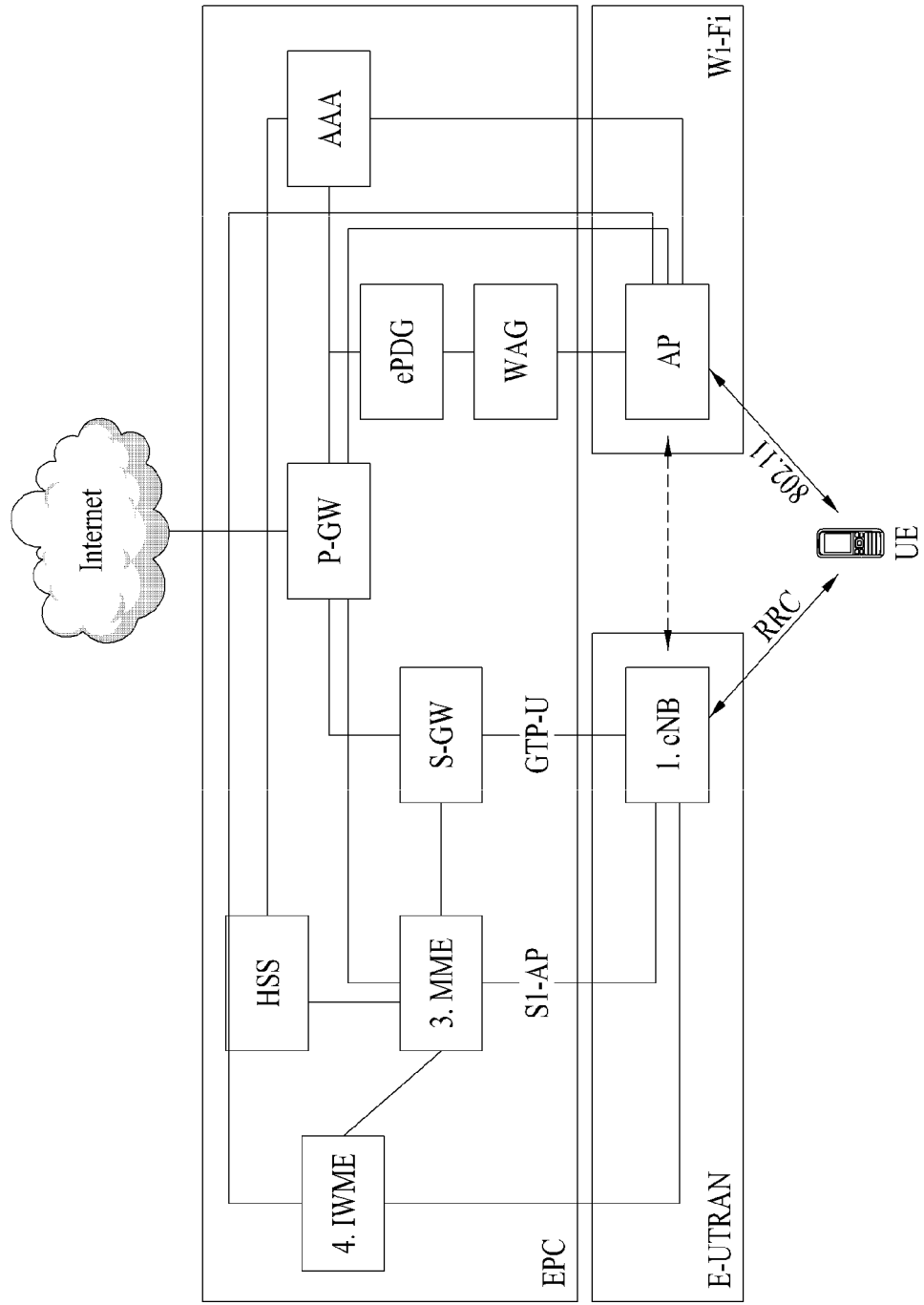
FIG. 6 illustrates an exemplary network structure of WiFi-Cellular interworking according to the present invention.

FIG. 6 illustrates an exemplary network structure of WiFi-Cellular interworking according to the present invention.

In an environment having a user equipment, which can transmit and receive a WiFi network and a Cellular network at the same time, existing therein, in order to allow the dual mode or multi-RAT user equipment to use a WiFi-cellular convergence network more efficiently, the cellular network may manage information on the AP in accordance with 4 methods described below.

Method 1. Use air interface between eNB and AP

This indicates that the eNB controls the AP by using its wireless control connection with the AP, which is similar to a general UE.

Method 2. Use backhaul interface between eNB and AP

This indicates that the eNB controls the AP by using its wireless control connected with the AP.

Method 3. Use control interface between MME and AP

This indicates that the AP is controlled by using the control connection between the MME and the AP (i.e., secondary system).

Method 4. Use control interface between IWME and AP

This indicates that the AP is controlled by using the control connection between the IWME and the AP (i.e., secondary system).

Figure 7:
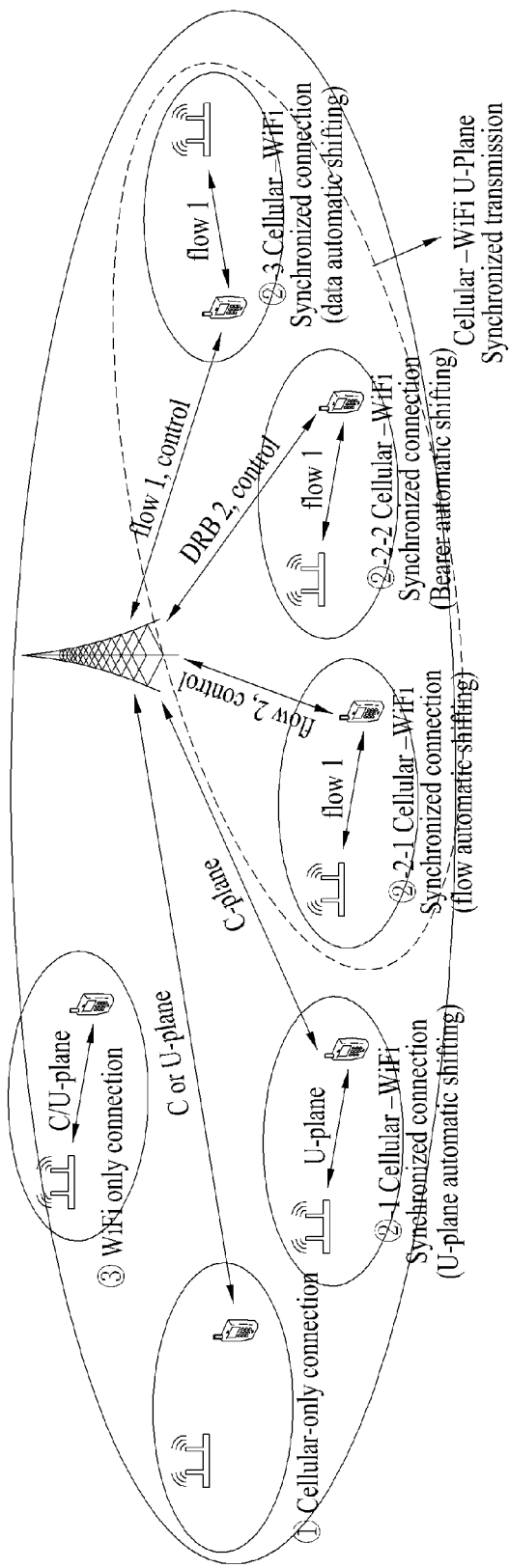
FIG. 7 illustrates an example for describing a scenario of a WiFi-Cellular convergence network.

FIG. 7 illustrates an example for describing a scenario of a WiFi-Cellular convergence network.

Scenario ① of FIG. 7 corresponds to a cellular-only connection scenario of the user equipment. And, herein, for WiFi automatic shifting/synchronized (or simultaneous) transmission in a state where the user equipment is only connected to the cellular network, a preparatory (or prerequisite) technology is required to be defined. AP information management for interworking is realized at a network level (cellular-WiFi), and WiFi discovery and WiFi network connection are realized in a device level (cellular-device-WiFi). ②-1 to ②-3 은 represent WiFi automatic shifting of a user plane (U-Plane), WiFi automatic shifting of a flow, WiFi automatic shifting of a bearer, WiFi automatic shifting of data between each of cellular-WiFi. According to ②-1, when a cellular-WiFi U-plane automatic shifting is performed, all data are transmitted only via WiFi. According to scenarios ②-2, ②-3, when the cellular-WiFi U-plane is shifted to perform synchronized transmission, data may be available for synchronized transmission by using a bandwidth segregation or aggregation method. Herein, Bandwidth segregation corresponds to automatic shifting for each flow (service/IP flow), as shown in ②-2, and each of the different flows is transmitted through a different RAT. In ②-2, the automatic shifting for each flow may correspond to one or more than one service/IP flow(s). More specifically, this may correspond to flow-unit shifting (②-2-1) or shifting for each Data radio (or EPS) bearer (②-2-2). Bandwidth aggregation allows transmission to be performed in data units through different RATs even in case of a same flow, as shown in ②-3.

As shown in Scenario ②, after the WiFi automatic shifting is performed, cellular link control may be performed based upon WiFi, as shown in Scenario ③. Control of cellular link related paging or radio link failure (RLF) may be received through a WiFi link.

Hereinafter, details of Connection Procedures( ) of IEEE 802.11 WLAN will be described.

In the connection procure, a Scanning step is divided into Passive scanning and active scanning, and, in the scanning step, the user equipment (e.g., STA) searches for a neighboring AP and stores the searched AP, and, then, the user equipment receives a beacon frame of the neighboring AP and transceives a probe and probe response frame. Subsequently, as a Join step, the user equipment selects an AP among the searched neighboring APs and performs synchronization on the searched AP and then collects information on the AP. Thereafter, a beacon frame of the selected AP is received. Subsequently, as an Authentication step, the user equipment is authenticated. An Open system authentication procedure performs unconditional authentication based upon an authentication request made by the user equipment, and a Shared Key authentication procedure performs authentication by verifying a Shared Secret Key. An Authentication frame is transmitted/received (or transceived). Then, in an Association step, the user equipment is assigned with an Association ID (Identifier) through an Association Response frame and then transmits/receives (or transceives) Association Request and Response frames.

Figure 8:
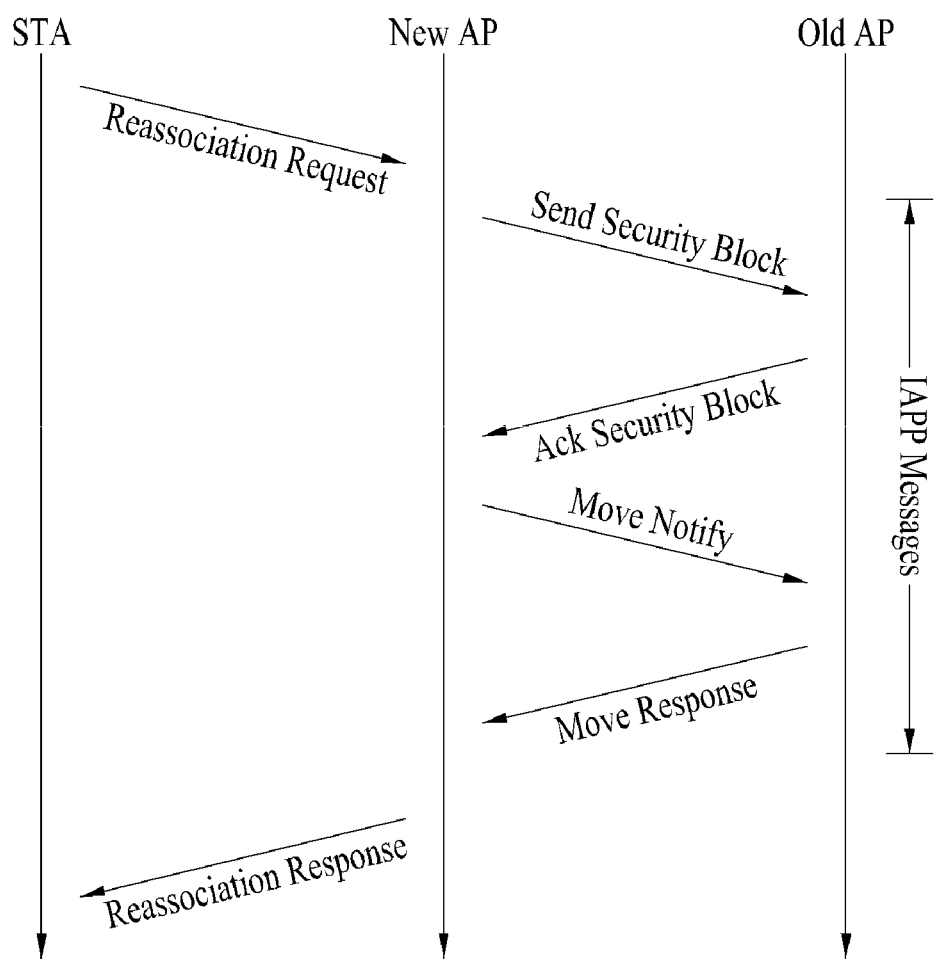
FIG. 8 illustrates exemplary Reassociation Procedures in an IEEE 802.11 WLAN system.

FIG. 8 illustrates exemplary Reassociation Procedures in an IEEE 802.11 WLAN system.

Reassociation occurs when the user equipment (STA) shifts (or relocates) to another AP coverage. The user equipment transmits information on the MAC address of the current AP to a New AP through a Reassociation Request frame. Thereafter, IAPP (Inter-AP Protocol) messages are exchanged between the New AP and the Old AP. The New AP requests the IAPP to relay information on the old AP, and the old AP deletes AID (Association Id) of the user equipment (STA). IAPP (Inter-AP Protocol) 802.11f corresponds to a protocol exchanging context between APs in the WLAN system through the DS, and, when the AP caches the exchanged PMK information, and when the user equipment (STA) performs a reassociation request by using an identifier of a key (keyID) used by the old AP, the AP performs key exchange without performing an authentication process by using the cached PMK.

Diaasociation Procedures of IEEE 802.11 WLAN will hereinafter be described briefly. Disassociaiton corresponds to a notification and does not correspond to a request. In order to enable an AP that is to be removed from the network for the service or for any other reason, STAs are required to be disassociated. The disassociation frame is transmitted, and, herein, a Reason code is included in the disassociation frame and then transmitted.

Scanning/join related frames in the IEEE 802.11 WLAN system will hereinafter be described.

Beacon frame: This is only transmitted periodically from the AP. However, in case the channel is busy at the time of the transmission, the transmission may be delayed. A Frame control includes Duration, DA, SA, BSSID, Fragment number, Sequence information, and a Frame body includes Time stamp, beacon interval, capability information, {SSID, Supported rates, DS parameter Set, TIM} IEs. TIM corresponds to a Traffic Indication MAP and is used as an indication (indication via AID) for waking the user equipment that is in a Doze mode.

Probe request frame: This is used in Active scanning. The Frame control includes Duration=0x0000, DA=broadcast, SA, BSSID=any AP, Fragment number, Sequence. The Frame body include {SSID, Supported Rates} IEs.

Probe response frame: This is transmitted as a response to the Probe. The Frame control includes Duration, DA, SA, BSSID, fragment number, Sequence, and the Frame body includes a Time stamp, beacon interval, capability information, {SSID, supported rate, DS parameter Set} IEs.

Association related frames in the IEEE 802.11 WLAN system.

Authentication frame: This is used when performing authentication request and response, and since both formats are identical, the frame is differentiated by an Authentication transaction Sequence. The Frame control includes Duration, DA, SA, BSSID, Fragment number, Sequence, and the Frame body includes Authentication Algorithm Number, Status code, channel text IE. Authentication Algorithm Number: Open System, Shared Key, Fast BSS Transaction Association request frame: This includes a listen interval, which indicates a time period for staying in the power saving mode when requesting for an association. The Frame control includes Duration, DA, SA, BSSID, Fragment number, Sequence, and the Frame body includes Capability information, Listen Interval, {SSID, Supported Rates} IEs.

Association response frame: This is transmitted as a response to the Association request and is assigned with an AID value. The frame control includes Duration, DA, SA, BSSID, Fragment number, Sequence, and the Frame body includes Capability information, Listen Interval, Current AP address, {SSID, Supported Rates} IEs.

Re/Disassociation related frames in IEEE 802.11 WLAN will hereinafter be described.

Reassociation request frame:

Reassociation response frame: The same frame as the Association response frame is used, and an AID value that is to be used by a new AP is assigned herein. The frame control includes Duration, DA, SA, BSSID, fragment number, Sequence, and the Frame body includes Capability information, Status Code, Association ID, Supported Rates IE. In a Disassociation/Deauthentication frame, the Frame control includes Duration, DA, SA, SSIC, IE, fragment number, sequence, and the Frame body includes a Reason Code.

A Power saving mode in an IEEE 802.11 system will be described.

Doze mode: In order to save the power of the user equipment, this corresponds to a mode that stops the operation of the transceiver for a predetermined period of time, in case there are no data that are to be transmitted by the corresponding user equipment, in case there are no data that are to be delivered to the corresponding user equipment.

A shifting method from the Awake mode to the Doze mode is carried out by indicating a Listen interval of an initial association request frame, thereafter shifting to the Doze mode is performed. Alternatively, whenever required, a null data frame that is set to PM=1 is transmitted, and, after receiving an ACK respective to this, the UE may enter the Doze mode. In the doze mode, the UE verifies traffic indication control information (e.g., Traffic Indication MAP IE message), and the UE is momentarily awake near a time point when a Beacon frame is being transmitted, thereby verifying the beacon frame.

In case of a method for shifting from the Doze mode to the Awake mode, if a bit corresponding to its AID is set to 1 in the TIM, the user equipment awakes and inputs its AID to a duration section of a PS-Poll message and transmits its AID. After receiving the PS-Poll frame, the AP delivers the data that are being buffering to the user equipment. If there are one or more buffered frames, more data bits are set to 1, so as to notify the user equipment that there are more frames.

The description of the IEEE 802.11 WLAN, which is described above, may be applied to the description of the present invention. The related art inter RAT technology has been designed based upon a request of the user equipment, it does not require interworking between a wireless LAN and a cellular network, a specific network server manages the wireless LAN information, and inter RAT handover is enabled upon request of the user equipment. Moreover, even if the user equipment is capable of carrying out synchronized connected to Multiple RAT, by supporting only flow mobility/IP-flow mapping of a control network level of a Radio level, synchronized connection to Multiple RAT was enabled. For such reasons, the related art method did not required any control connection between the AP and the cellular network, and access (or connection) to the Multiple RAT was enabled based upon request of the user equipment. Such related art method had its limitations in enhancing the overall network efficiency, due to the fact that the network situation was not accurately understood, and that RAT selection was made by focusing mainly on the user equipment.

In order to enhance the QoS of the user equipment by using Multi-RAT, and also to enhance the overall network efficiency, a network-based tightly-coupled MultiRAT management technology is required to be provided rather than a UE request based management technology. By establishing a direct control connection between different RATs in a network level, the method is more efficient, and the performance of a faster inter-RAT interworking is required, and data of the user equipment is required to be transmitted by the most optimal RAT by the subject of the corresponding interworking process. Before a Multi RAT UE is connected to two different RATs, the network may help the user equipment select the optimal RAT or AP, and, in order to do so, the network may require information on a secondary system, such as WiFi, to the user equipment. In the present invention, a user equipment being simultaneously connected to two different RATs (or communication systems) will be referred to as a Multi-RAT user equipment.

The present invention seeks to define an overall procedure before the point when the user equipment is connected to the secondary system, wherein information on the secondary system is received of the primary system before the Multi-RAT user equipment connects to the secondary system, and wherein the user equipment transmits the searched secondary system information to the primary system. Most particularly, a method, wherein, in case the Multi-RAT user equipment is in an idle mode state, downlink data transmitted from the network to the user equipment are generated, and wherein, when the corresponding downlink data are intended to be transmitted to the user equipment, connection may be immediately made to a WiFi link without having to undergo any connection establishment to the cellular network, thereby directly offloading data via WiFi, is proposed herein.

Figure 9:
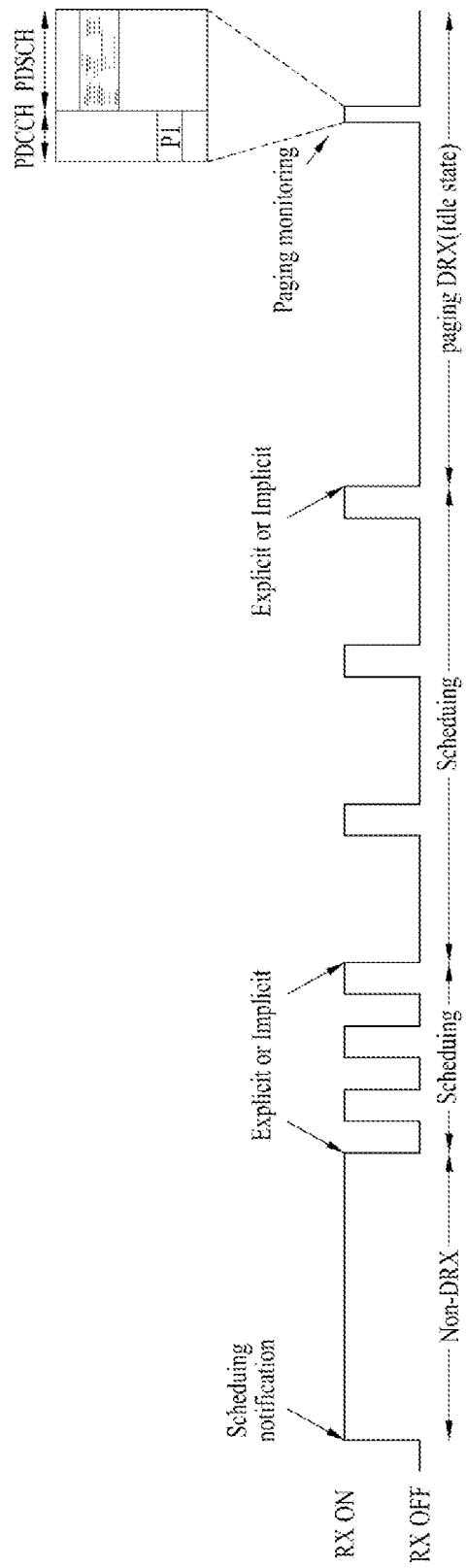
FIG. 9 illustrates an example for describing a paging procedure in a cellular network.

FIG. 9 illustrates an example for describing a paging procedure in a cellular network.

As an example of a cellular communication system, DRX (Discontinuous Reception) (connected/idle state) in a LTE system will hereinafter be described. FIG. 9 illustrates a discontinuous reception method of the user equipment, wherein the user equipment, which does not receive any data during a predetermined period of time, may enter non-DRX (active mode)→short DRX (sleep mode)→long DRX (sleep mode)→paging DRX (idle mode). If the user equipment detects that data scheduled to the user equipment itself exist through the control channel during the listening interval, the user equipment directly shifts to the non-DRX mode and receives the data. Herein, an idle state user equipment has its position managed by the MME in tracking area units, and the eNB signifies a state, wherein all information of the user equipment is released.

At this point, the cellular communication system user equipment verifies its paging channel by awaking at each paging DRX duration cycle in order to receive the downlink data that may be transmitted to the user equipment itself. The user equipment monitors the paging channel (PCH) by awaking in the subframe assigned to the user equipment itself during each of its paging DRX, and, then, the user equipment verifies the presence or absence of any paging message that is being transmitted, by performing blind decoding using a Paging RNTI.

Hereinafter, a Discontinuous Reception (DRX) for paging will be described. The user equipment uses DRX in the idle mode in order to reduce power consumption. One Paging Occasion (PO) corresponds to one subframe, and the Paging Occasion (PO) corresponds to a P-RNTI, which is transmitted over a PDCCH addressing the paging message. One Paging Frame (PF) corresponds to one radio frame and may include one or multiple POs. When the DRX is used, the user equipment is required to monitor only one PR for each DRX cycle.

The PF and the PO decide the following equation by using the DRX parameters, which are provided in the system information. Reference may be made to Table 1 shown below for details in deciding such PF and PO.

TABLE 1

PF is given by following equation:
SFN mod T= (T div N)*(UE_ID mod N)
Index i_s pointing to PO from subframe pattern defined in 7.2 will be derived from following calculation:
i_s = floor(UE_ID/N) mod Ns
System Information DRX parameters stored in the UE shall be updated locally in the UE whenever the DRX parameter values are changed in SI.
If the UE has no IMSI, for instance when making an emergency call without USIM, the UE shall use as default identity UE ID = 0 in the PF and i_s formulas above.
The following Parameters are used for the calculation of the PF and i_s:
T: DRX cycle of the UE. T is determined by the shortest of the UE specific DRX value, if allocated by upper layers, and a default DRX value broadcast in system information. If UE specific DRX is not configured by upper layers, the default value is applied.
nB: 4T, 2T, T, T/2, T/4, T/8, T/16, T/32.
N: min(T,nB)
Ns: max(1,nB/T)
UE_ID:IMSI mod 1024.
IMSI is given as sequence of digits of type Integer (0..9), IMSI shall in the formulae above be interpreted as a decimal integer number, where the first digit given in the sequence represents the highest order digit.
For example:
IMSI = 12 (digit1=1, digit2=2)
In the calculations, this shall be interpreted as the decimal integer "12", not "1×16+2 = 18".

Figure 10:
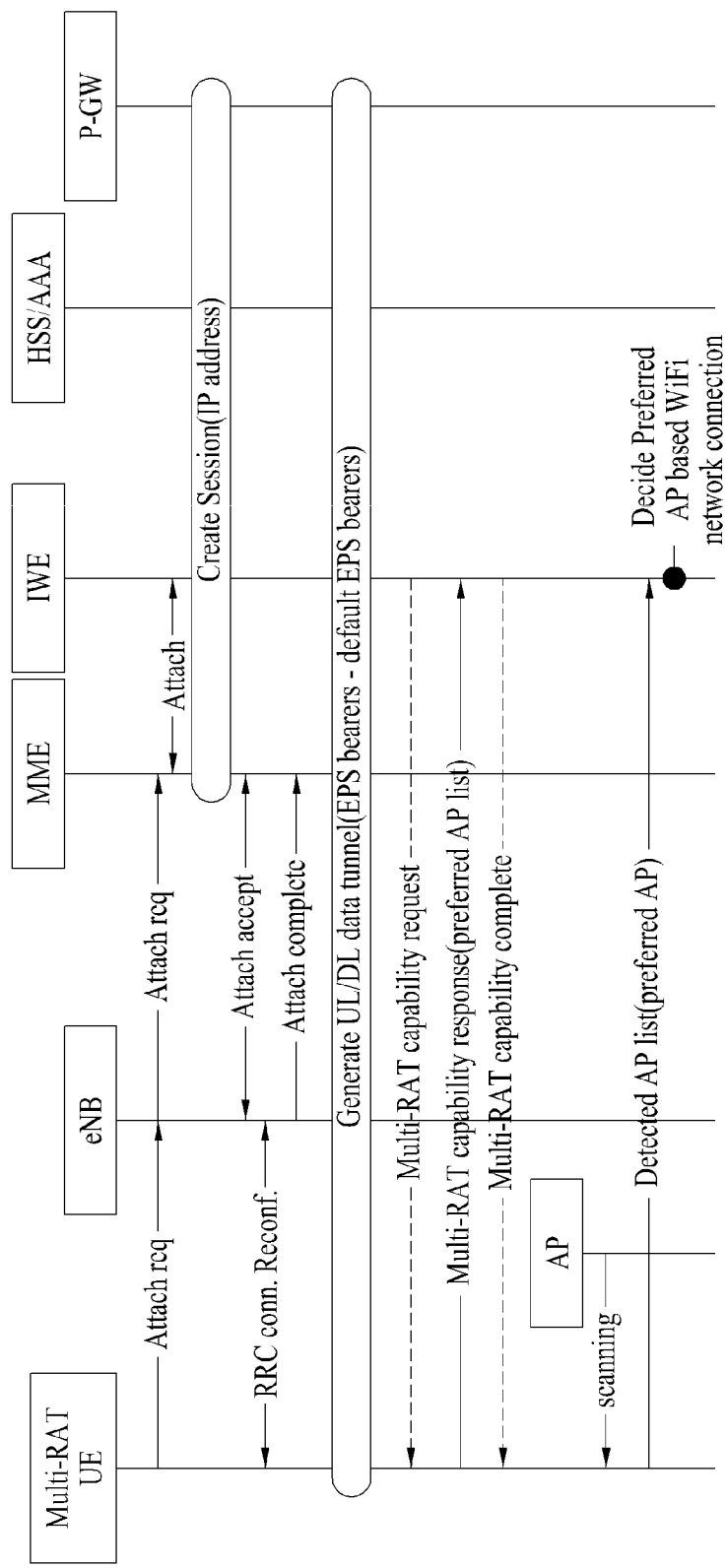
FIG. 10 illustrates exemplary attach and Multi-RAT capability negotiation procedures of a Multi-RAT user equipment.

FIG. 10 illustrates exemplary attach and Multi-RAT capability negotiation procedures of a Multi-RAT user equipment.

Referring to FIG. 10, the Multi-RAT UE performs an attach procedure (attach request, attach accept, and so on) with the base station (eNB), MME, and IWE of the cellular network. After completing the attach procedure, the Multi-RAT UE may generate a UL/DL data tunnel (EPS bearers-default EPS bearers).

Thereafter, the Multi-RAT user equipment may perform a MULTI-RAT capability negotiation procedure with the cellular network (e.g., IWE). More specifically, when the IWE sends a MULTI-RAT capability request message to the Multi-RAT UE, as a response to the request message, the Multi-RAT UE sends a Multi-RAT capability response message, which includes a list of preferred APs. Thereafter, the IWE transmits a Multi-RAT capability complete message to the UE, thereby completing the Multi-RAT capability negotiation procedure. A preferred AP list may be transmitted in advance during an earlier connection step with the IWE (e.g., WiFi capability negotiation during or after connection (re)establishment) as one of the WiFi related capabilities of the UE.

The Multi-RAT user equipment scans the APs, and, then, the Multi-RAT user equipment may transmit information on a list of detected APs based upon the scanning result (or a Preferred AP list among the detected AP list) to the IWE. Information on the Preferred AP may correspond to an AP ID, such as an SSID (Service Set IDentifier)/BSSID (Basic Service Set IDentifier) respective to an AP, which is frequently connected by the Multi-RAT user equipment, or which frequently remains connected by the Multi-RAT user equipment for long period of time, and such Preferred AP may correspond to SSID/BSSID of a public AP or SSID/BSSID of a Private AP, which is installed in locations, such as companies, coffee shops, homes, and so on. The IWE may decide a WiFi network connection based upon the preferred AP list, which is received from the Multi-RAT UE. As described above, FIG. 9 illustrates the WiFi capability negotiation procedure and process of deciding a Preferred AP based WiFi network access (or connection).

As described above, although the Multi-RAT UE has completed a pre-attachment to the WiFi, in order to minimize UE battery consumption due to this procedure, a process of instructing pre-association as well as shifting to a WiFi power saving mode is proposed herein. In case of the pre association, it will be preferable that the process is performed in case a preferred AP of the Multi-RAT UE is detected.

In the present invention, in case the network supports a Cellular-WiFi convergence technology, a new WiFi idle mode procedure for instructing WiFi pre-association and for minimizing power of the Multi-RAT UE at this point will be proposed. Hereinafter, the WiFi pre-association and the new WiFi Power Saving mode, which are newly proposed, will be described in detail.

Figure 11:
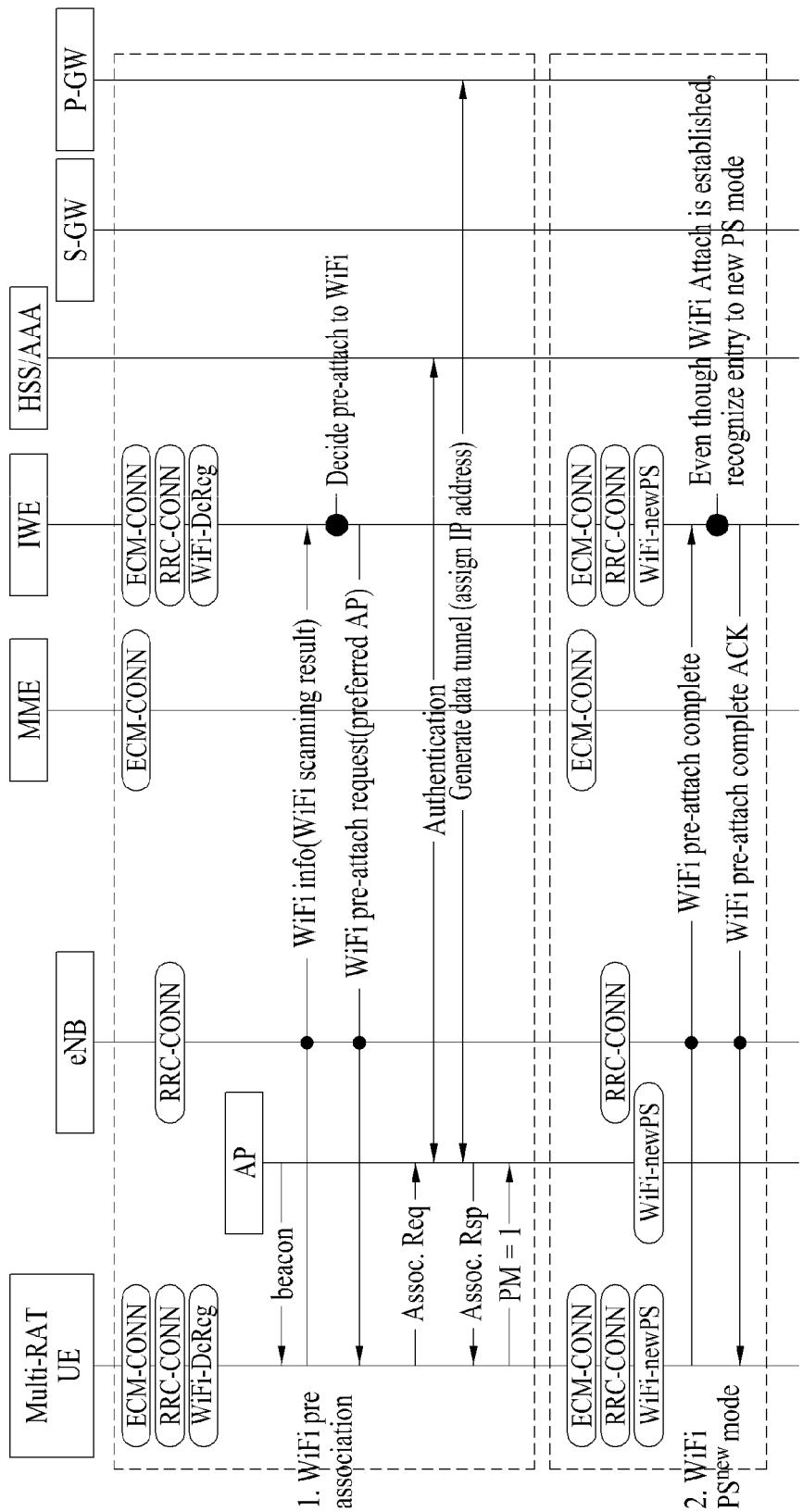
FIG. 11 illustrates an example for describing a procedure enabling the interworking entity to perform WiFi connection (ort association) of the Multi-RAT user equipment in advance (WiFi pre association procedure) and a new Power Saving mode.

FIG. 11 illustrates an example for describing a procedure enabling the interworking entity (e.g., eNB, MME, new entity in cellular network) to perform WiFi connection (or association) of the Multi-RAT user equipment in advance (WiFi pre association procedure) and a new Power Saving mode.

As shown in FIG. 11, in case the Multi-RAT user equipment is in a RRC_Connected state with a cellular network, and in case the Multi-RAT user equipment is in a WiFi-Deregistration state (i.e., a state of being deregistered from the WiFi network and being operated in an idle mode), the Multi-RAT user equipment may receive a beacon signal, which corresponds to a signal being periodically broadcasted from at least one AP. The Multi-RAT user equipment may perform WiFi scanning for detecting APs and may, then, transmit the WiFi scanning result to the cellular network (e.g., IWE). Accordingly, in case the cellular network determines (or decides) to allow the WiFi connection (or attachment) of the Multi-RAT user equipment to be performed in advance (e.g., the decision is made by detecting a preferred AP), the cellular network may transmit a WiFi pre-attach request message to the Multi-RAT user equipment, wherein the message indicates a WiFi pre-attach to the preferred AP.

Additionally, since the cellular network is aware of the fact there are not downlink data that are to be transmitted to the Multi-RAT user equipment via WiFi, in case there are no downlink data to be transmitted to the Multi-RAT user equipment via WiFi, in order to minimize the power of the Multi-RAT user equipment, in the WiFi pre-attach request message, while instructing the WiFi pre-attach, the cellular network may also instruct the Multi-RAT user equipment to enter the WiFi power saving mode as soon as the WiFi pre-attach is completed. In the present invention, the above-described procedure will be referred to as a WiFi pre-association of the Multi-RAT user equipment.

Moreover, while the IWE of the cellular network instructs the WiFi power saving mode entry of the Multi-RAT user equipment, and in case the user equipment enters the WiFi power saving mode in accordance with such instruction, as opposed to the conventional method, a procedure allowing the power saving mode to be performed without any listening interval is being proposed herein. The Multi-RAT user equipment may transmit an indicator (PM=1) notifying the corresponding AP that the user equipment will be entering the WiFi power saving mode.

After the Multi-RAT user equipment enters the WiFi power saving mode, the Multi-RAT user equipment may transmit a WiFi pre-attach complete message notifying the completion of the WiFi pre-attach to the IWE. Accordingly, the IWE may recognize (or identify) that the Multi-RAT user equipment has entered the WiFi power saving mode even though the WiFi attach is established. As a response to the WiFi pre-attach complete message, the IWE may send an ACK message (e.g., WiFi pre-attach complete ACK message) to the Multi-RAT user equipment.

Hereinafter, the case of instructing pre-association and instructing shifting to the WiFi power saving mode at the same time will be described in more detail with reference to FIG. 12.

Figure 12:
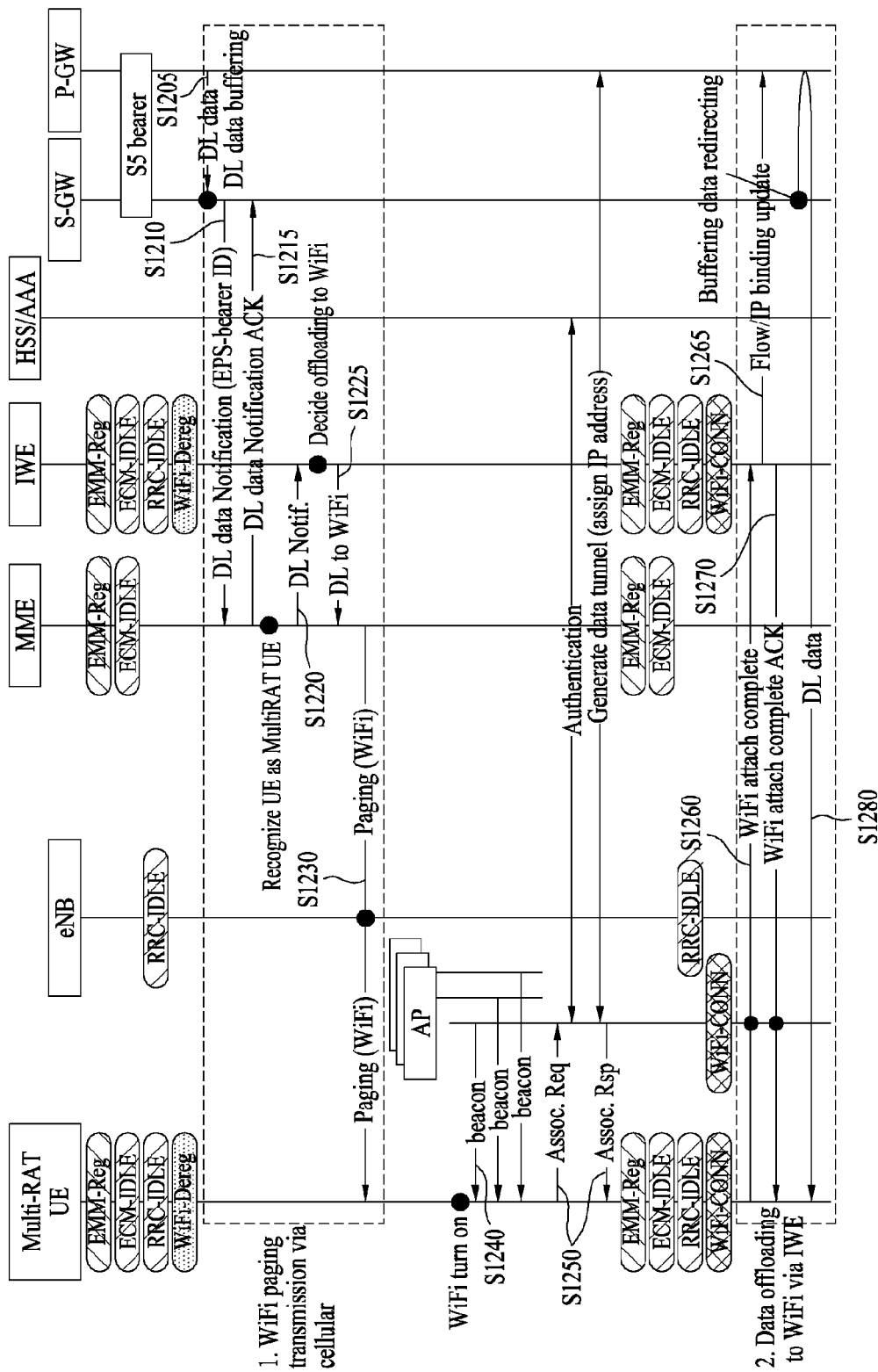
FIG. 12 illustrates an example of a new WiFi pre-association procedure proposed in the present invention.

FIG. 12 illustrates an example of a new WiFi pre-association procedure proposed in the present invention.

Referring to FIG. 12, the Multi-RAT user equipment may perform a Multi-RAT capability negotiation procedure with the cellular network (e.g., IWE). During the Multi-RAT UE capability negotiation, the presence or absence of a capability respective to pre-association may be configured between one another during the procedure of having the Multi-RAT user equipment perform a negotiation procedure on its MultiRAT related capability with the IWE. More specifically, when the Multi-RAT user equipment sends a MULTI-RAT capability negotiation request message to the IWE, as its respective response, the IWE sends a Multi-RAT capability negotiation response message to the user equipment. In case the pre-association, which is proposed in the description of the present invention, is defined, it will be preferable to exchange in advance whether or not the corresponding procedure can be performed between the Multi-RAT user equipment and the IWE. If the Multi-RAT user equipment and the cellular network are both transmitted and received, and in case both support pre-association, the pre-association related procedure may be performed.

The following parameters shall be defined in the Multi-RAT Capability Negotiation related message.

WiFi Pre-Association support (1 bit) shall be defined, and, at this point, for example, if the value of 1 bit is equal to 0, this shall indicate that the pre-association cannot be performed, and, if the value of 1 bit is equal to 1, this shall indicate that the pre-association can be performed. Additionally, the Multi-RAT user equipment and IWE may include and transmit information on their preferred APs in the MultiRAT Capability Negotiation related message. By setting the WiFi pre-association support (1 bit) to 1 in the Multi-RAT capability negotiation request message and by transmitting the message accordingly, the Multi-RAT user equipment may notify that it supports pre-association.

Thereafter, the Multi-RAT user equipment may receive a beacon signal, which is a signal that is periodically transmitted, from at least one AP, and, after performing WiFi scanning, the Multi-RAT user equipment may transmit the WiFi scanning result to the cellular network (e.g., IWE). Accordingly, in case the cellular network (e.g., IWE) decides that the WiFi connection of the UE should be performed in advance (pre-attached to WiFi), the cellular network (e.g., IWE) may transmit a WiFi pre-attach request message to the Multi-RAT user equipment, wherein the message instructs the Multi-RAT user equipment to perform WiFi pre-attach to a preferred AP. The WiFi pre-attach request message may include the following parameters.

1) BSSID/SSID respective to Pre association AP
2) Indicator performing indication on the entry to WiFi Power Saving mode
3) Information on the WiFi Listening interval section
4) Pre-association deadline timer Considering a sufficient time for the Multi-RAT user equipment to complete association with the AP and shifting to the power saving mode, the Pre-association deadline timer may be set to a time value after the considered time. When the WiFi pre-attach request message is received, the Multi-RAT user equipment performs pre-association to the AP with respect to the corresponding BSSID/SSID. Thereafter, when the WiFi pre-attach request message is received, the Multi-RAT user equipment starts the Pre-association deadline timer.

After receiving the WiFi pre-attach request message, the Multi-RAT user equipment configures (or sets up) a connection with the AP, which is transmitted from the IWE, through an Association REQ/RSP message.

In case has received the WiFi pre-attach request message having a WiFi Listening interval configured therein, the Multi-RAT user equipment may configure (or set up) a listening interval of an Association request message during the association procedure with the AP by referring to the corresponding WiFi listening interval value, and, then, in case the Multi-RAT user equipment receives "0" as the WiFi listening interval, or in case the WiFi listening interval receives a reserved value, which is prearranged with the IWE, as the WiFi listening interval, by transmitting an Association request message and by receiving an Association response message from the AP, the Multi-RAT user equipment may shift to the WiFi power saving mode, which has no listening interval to the WiFi (i.e., which receives paging through the cellular network).

In case a message having its WiFi power saving (PS) mode indication set to 1 is received, the shifting to the PS mode may be immediately notified to the AP by using a WiFi PS mode shifting method, which is the same as transmitting a null data frame being set as PS mode='1'. In case the WiFi PS mode indication is set to 1, by indicating the WiFi listening interval at the same time, the Multi-RAT user equipment may be capable of using the WiFi power saving mode much more efficiently.

In case of using the WiFi pre-attach request message, as a message signifying an indication, wherein the transmission of the BSSID/SSID respective to an association AP implicitly notifies power saving mode entry with the corresponding AP, and also signifying that the WiFi listening interval has been set to "0" or to a reserved value receiving paging through the cellular network, in case the Multi-RAT user equipment receives the corresponding message, this may signify that the Multi-RAT user equipment shifts to the WiFi power saving mode having no listening interval immediately after completing the association. More specifically, in case the WiFi pre-attach request is defined, only the BSSID/SSID respective to the pre-association AP may be transmitted, or the WiFi listening interval may be explicitly transmitted as required.

As described above, when the Multi-RAT user equipment receives an indicator notifying the entry to the power saving mode through the WiFi pre-attach request message, the Multi-RAT user equipment enters the power saving mode, and, then, the Multi-RAT user equipment may notify its entry to the power saving mode to its respective AP (PM=1).

In case the Multi-RAT user equipment has successfully established all pre-association with the AP, which is defined above, the Multi-RAT user equipment transmits a WiFi (pre) attach response message or a WiFi (pre)attach complete message to the IWE. This shall be transmitted before the Pre association deadline timer is expired, and, in case the Pre-association deadline timer is expired, the pre-association shall be considered a failure.

The WiFi (pre) attach response message or the WiFi (pre)attach complete message may include the following parameters.

1) AP ID, such as BSSID/SSID and so on of a (Pre) association AP
2) Status result: information notifying whether the (pre) Association is successful or has failed
3) In case the (pre)-association has failed, the cause of failure is included.
4) Indicator notifying whether or not entry (or shifting) to the PS mode is performed: In case the PS mode entry through pre-association is defined as a new WiFi PS mode, wherein a beacon message is not received for each listening interval, the indication on whether or not entry or shifting to the PS mode has occurred may signify an entry to a new WiFi PS mode.
5) WiFi Listening interval
If a WiFi Listening interval value is transmitted,
1. In case the Multi-RAT user equipment sets the value actually set up in the WiFi to "0" or to a reserved value that is pre-arranged with the IWE, the IWE may be capable of knowing (or recognizing) that the user equipment has entered the new WiFI PS mode.
2. In case the corresponding value is not set to "0" or to a reserved value that is pre-arranged with the IWE, the IWE may be capable of knowing (or recognizing) that the user equipment has entered the conventional WiFi PS mode.
6) Association Id (AID), IP address that is configured with the AP When operating the new WiFi PS mode, the Multi-RAT user equipment does not monitor the periodic broadcast signal (e.g., beacon signal) of the AP that has completed the association until any instruction is given (or made) by the cellular network. Moreover, the Multi-RAT user equipment may receive information on whether or not data that can be transmitted from a related AP exist (paging) through the cellular network.

When the above-described WiFi (pre) attach response message or WiFi (pre)attach complete message is received from the Multi-RAT user equipment, the IWE may recognize that the Multi-RAT user equipment is attached to WiFi but has entered the new WiFi PS mode. While the Multi-RAT user equipment is being operated in the new WiFi PS mode, in case the IWE receives data from the cellular network, the IWE may decide to perform data transmission via WiFi. Thereafter, the IWE may transmit a message to the Multi-RAT user equipment, wherein the message instructs the Multi-RAT user equipment to receive a WiFi beacon signal, or wherein the message notifies the Multi-RAT user equipment that AID data have arrived (or have been received). Accordingly, the Multi-RAT user equipment may receive the beacon signal from the AP and enter the Awake state, and, then, the Multi-RAT user equipment may notify the IWE that the Multi-RAT user equipment has entered the Awake state.

As described above, in the new WiFi PS mode, since the Multi-RAT user equipment does not monitor the beacon of the AP, which has completed the association, until any instruction is received from the cellular network, and since the Multi-RAT user equipment enters the WiFi awake state after receiving an instruction to received the WiFi beacon from the cellular network, the enhancement in the power saving effect of the Multi-RAT user equipment becomes outstanding.

An idle mode user equipment in the related art cellular network wakes periodically and receives only the broadcast information (e.g., paging, MIB, SIB1, SIB2~SIB8) that is required by the idle mode user equipment. Herein, the reception of a system information block (SIB) being transmitted to the BCH is updated only in case the corresponding information is corrected through paging. In case downlink data being transmitted to the idle mode user equipment exist, by allowing paging to be transmitted to all eNBs existing in the tracking area of the idle mode user equipment through the MME, instruction is made so that the user equipment (UE) is shifted to a connected mode, and, then, downlink data are transmitted.

In case the user equipment is a Multi-RAT user equipment supporting Multi-RAT, the IWE may decide to immediately transmit the data of the user equipment via WiFi in accordance with the network status (load, interference, and so on).

WiFi data offloading refers to distributing (or dispersing) traffic through a WiFi network router or an AP (Access Point) and not to using a cellular network.

The WiFi data offloading method according to the WLAN status of the idle mode user equipment in the present invention will be proposed with respect to 4 different scenarios.

Scenario 1: A case when the WLAN status of the idle mode user equipment is in a Deregistered mode Scenario 2: A case when the WLAN status of the idle mode user equipment is in a power saving mode Scenario 3: A case when the WLAN status of the idle mode user equipment is in a power saving mode that does not monitor the listening interval Scenario 4: A case when the WLAN status of the idle mode user equipment is in a connected mode: In case of Scenario 4, WiFi paging is not required When downlink data, which are being transmitted to a user equipment having no WiFi connection, are intended to be offloaded via WiFi, as in Scenarios 1-3, network and user equipment operations that can minimize the battery consumption of the user equipment will hereinafter be proposed.

Scenario 1: WiFi Paging Through a Cellular Link in a Case when the User Equipment is not Connected to the AP FIG. 12 illustrates an exemplary drawing for describing a WiFi paging method in a case when the Multi-RAT user equipment is not connected to the AP as Scenario 1 according to the present invention.

Referring to FIG. 12, in case the downlink data that are to be transmitted to the idle mode Multi-RAT user equipment (a user equipment being in a RRC_IDLE state with the cellular network will hereinafter be referred to as a Multi-RAT idle user equipment) reach a buffer (S1205), and this is notified by the S-GW to the MME through a DL data Notification (including EPS bearer ID) message (S1210). The MME transmits an acknowledgement response message (e.g., DL data Notification ACK message) respective to the reception of the DL data Notification (including EPS bearer ID) message to the S-GW (S1215). Thereafter, before generating the data bearer, the MME may transmit a notification (DL Notification message) to the IWE, wherein the notification notifies the presence of downlink data that are to be transmitted to the idle mode Multi-RAT user equipment (S1220). In case the IWE determines to transmit the downlink data, which are to be transmitted to the idle mode user equipment, i.e., in case the IWE decides to perform offloading via WiFi, the IWE notifies the presence of downlink data that are to be transmitted to the idle mode Multi-RAT UE to the MME. In case the downlink data that are to be transmitted to the idle mode Multi-RAT UE arrive, and in case the IWE decides to transmit this via WiFi, the IWE may transmit a message to the MME, wherein the message (e.g., DL to WiFi request message) requests for the resuming of the WiFi connection of the idle mode Multi-RAT UE (S1225).

After receiving the message, which notifies data transmission via WiFi with respect to the idle mode Multi-RAT UE, the MME instructs all eNBs belonging to the tracking area of the idle mode Multi-RAT UE to transmit a WiFi paging message to the corresponding idle mode Multi-RAT UE (S1230). After receiving the instruction from the MME, each of the eNBs transmits a WiFi paging message through a paging channel (PCH) of the corresponding idle mode Multi-RAT UE (S1230).

In case the WiFi paging message is defined, a new WiFi paging message may be transmitted. In case of using the conventional (or already-existing) paging message without modification, a parameter signifying WiFi paging may be transmitted.

In case of Scenario 1, the cellular network may start the WiFi attach/awake deadline timer starting from a time point of transmitting the WiFi paging message, and the idle mode Multi-RAT UE may start the WiFi attach/awake deadline timer starting from a time point of receiving the WiFi paging message. In this case, the corresponding WiFi attach/awake deadline timer shall be transmitted to the idle mode Multi-RAT UE in advance, and, in case the corresponding WiFi attach/awake deadline timer is expired, the idle mode Multi-RAT UE performs connection establishment to a cellular network. In case of Scenario 1, a value of the corresponding WiFi attach/awake deadline timer is required to be set to a value after a time period that is sufficient for the idle mode Multi-RAT UE to search for neighboring APs and to establish connection with a specific AP.

In case the idle mode Multi-RAT UE, which used to periodically awake in order to verify its own PCH, receives the WiFi paging message, the idle mode Multi-RAT UE turns on a WiFi transceiver. In case of Scenario 1, the idle mode Multi-RAT UE searches for a neighboring AP. The idle mode Multi-RAT UE searches for a neighboring AP by receiving a beacon signal, which corresponds to a signal that is periodically broadcasted, and, then, the idle mode Multi-RAT UE establishes a connection to a specific AP. More specifically, the idle mode Multi-RAT UE receives a beacon signal, which corresponds to a signal that is periodically broadcasted, from at least one AP (S1240). Thereafter, association with the specific AP is established. After establishing the association, the idle mode Multi-RAT UE operates in a WiFi connected state (S1250).

For the network status, the idle mode Multi-RAT UE maintains the idle mode, and, for the WLAN (WiFi) status, the idle mode Multi-RAT UE shifts to a connected mode. In case of the idle mode Multi-RAT UE having its connection to WiFi successfully completed, the MME determines a location of the idle mode Multi-RAT UE from the IWE, and, then, the MME may newly register the location information of the idle mode Multi-RAT UE. More specifically, an eNB to which the connected AP belongs is registered, and the location of the idle mode Multi-RAT UE may be more accurately managed.

In case the idle mode Multi-RAT UE having completed the WiFi attach sends a WiFi attach complete message to the IWE (S1260), the IWE transmits information related to the Flow/IP binding update to the P-GW (S1265), and, as a response to the WiFi attach complete message, the IWE transmits an acknowledgement message (e.g., WiFi attack [attach] complete ACK message) to the idle mode Multi-RAT UE (S1270).

The S-GW performs redirecting on the buffered data and performs data offloading via WiFi through the IWE. More specifically, the idle mode Multi-RAT UE receives the downlink data of the cellular network from the WiFi AP (S1280). More specifically, after recognizing that the WiFi connection of the idle mode Multi-RAT UE has been successfully performed via WiFi, the IWE instructs the downlink data, which were buffered, to be transmitted through the connected WiFi. The idle mode Multi-RAT UE may receive the transmitted downlink data through the connected WiFi.

As described above, in FIG. 12, in case the downlink data of the idle mode Multi-RAT UE (i.e., Multi-RAT UE of the RRC_IDLE state) arrive at the buffer in the cellular network, a method of instructing the data to be transmitted to a secondary system (e.g., WiFi) without any cellular network connection establishment of the idle mode Multi-RAT UE has been proposed.

If a WiFi attach/awake complete message is not received until the WiFi attach/awake deadline timer is expired, or, in case, for example, the IWE is unable to receive any verification (or acknowledgement) on the WiFi connection establishment of the idle mode Multi-RAT UE through a network entity, such as P-GW/HSS/AAA, the MME transmits a cellular paging message to the P-GW/HSS/AAA. (More specifically, a service request of the idle mode Multi-RAT UE is guided through a cellular paging transmission respective to a downlink reception.)

As described above, in case the idle mode Multi-RAT UE, which has received WiFi paging, fails to establish connection to WiFi, a connection establishment to a cellular network is attempted. At this point, an Establishment (Service request) Cause may be newly defined in the Service Request/RRC Connection Request message as a "WiFi connection establishment failure" and may, then, be transmitted. After receiving such Service Request/RRC connection request message, the MME and eNB configure a data wireless bearer for transmitting the downlink data transmission, which is transmitted to the idle mode Multi-RAT UE, to the cellular network, and, then, the data transmission is performed to the cellular network.

The message including the corresponding cause ("WiFi connection establishment failure"), which is newly defined, may be transmitted instead of the WiFi attach/awake complete message. If the network does not detect a connection of the idle mode Multi-RAT UE to a wireless LAN (WiFi) for a predetermined period of time, this is considered as a WiFi connection failure.

Scenario 2: A Case when the WLAN Status of the Idle Mode Multi-RAT User Equipment is in a Power Saving Mode FIG. 13 illustrates an exemplary drawing for describing a WiFi paging method in a case when the WLAN status of the idle mode Multi-RAT user equipment is in a power saving mode according to Scenario 2.

Figure 13:
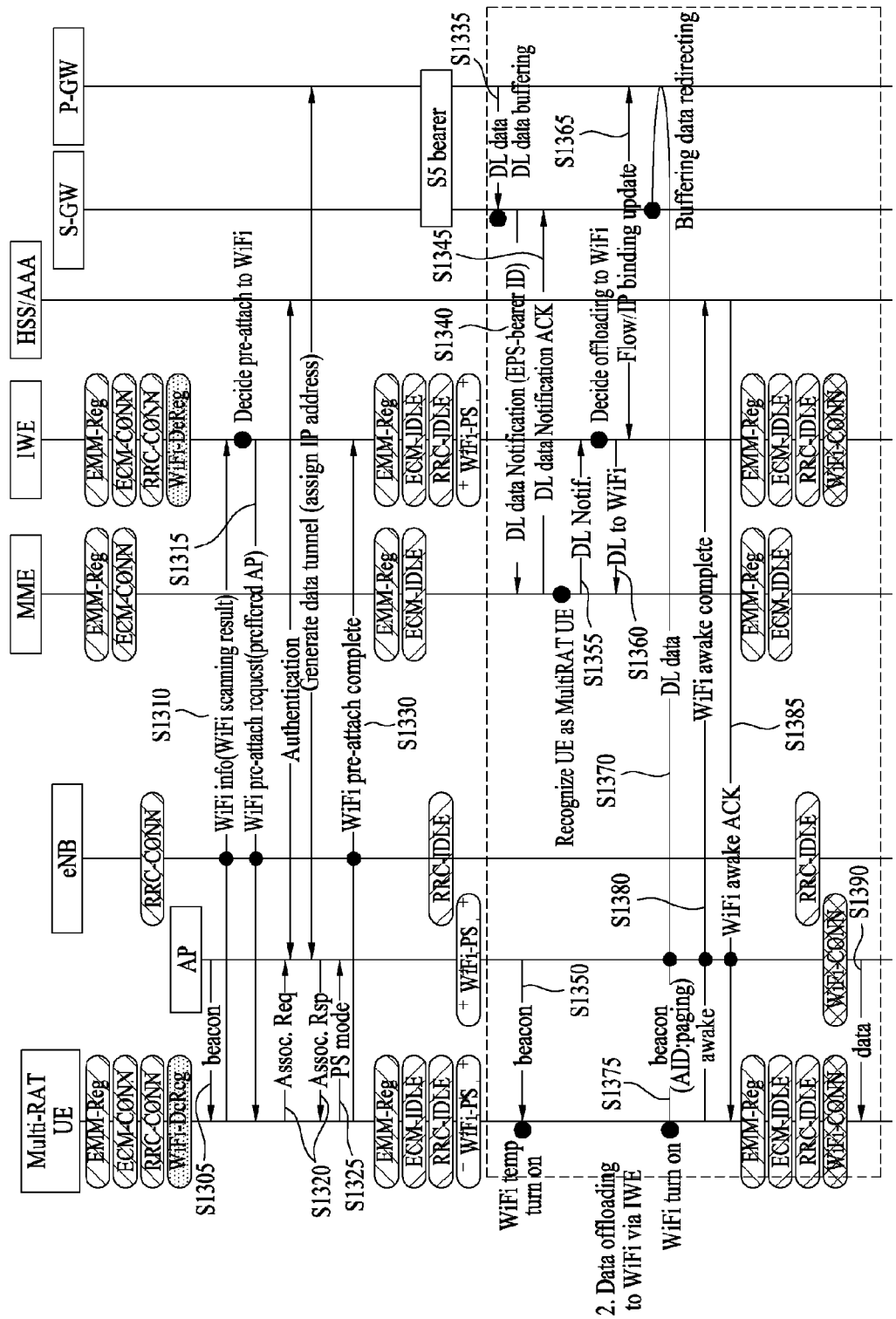
FIG. 13 illustrates an exemplary drawing for describing a WiFi paging method in a case when the WLAN status of the idle mode Multi-RAT user equipment is in a power saving mode according to Scenario 2.

As shown in FIG. 13, in case the Multi-RAT user equipment is in a RRC_Connected state with the cellular network, and in case the Multi-RAT user equipment is in a WiFi-Deregistration state (i.e., registration of the WiFi network is canceled and the operation state is in an idle mode), the Multi-RAT UE receives a beacon signal, which corresponds to a signal that is periodically broadcasted, from at least one AP (S1305). The Multi-RAT UE performs WiFi scanning for detecting APs, and, then, the Multi-RAT UE may transmit a WiFi scanning result to the cellular network (e.g., IWE) (S1310). Accordingly, in case the cellular network (e.g., IWE) decides to perform WiFi connection of the Multi-RAT UE in advance (e.g., this may be decided by detecting a preferred AP), the cellular network may transmit a WiFi pre-attach request message instructing the Multi-RAT UE to perform a WiFi pre-attach with the preferred AP (S1315).

Additionally, since the cellular network is aware of the fact that there are no downlink data that are to be transmitted to the Multi-RAT user equipment via WiFi, in case there are no data that are to be transmitted to the Multi-RAT user equipment via WiFi, the cellular network may instruct WiFi pre-attach in order to minimize the power of the Multi-RAT user equipment through the WiFi pre-attach request message, and, then, when the pre-attach is completed, the cellular network may instruct the Multi-RAT user equipment to enter the WiFi power saving mode (S1315). The Multi-RAT user equipment performs a procedure of establishing association with the corresponding AP (S1320). The Multi-RAT user equipment may transmit an indicator (PM=1) notifying the corresponding AP that the Multi-RAT user equipment will be entering the WiFi power saving mode (S1325). Thereafter, after entering the WiFi power saving mode, the Multi-RAT user equipment may transmit a WiFi pre-attach complete message to the IWE, wherein the WiFi pre-attach complete message notifies the completion of the WiFi pre-attach (S1330).

In case the downlink data that are to be transmitted to the idle mode Multi-RAT user equipment reach a buffer (S1335), and this is notified by the S-GW to the MME through a DL data Notification (including EPS bearer ID) message (S1340). The MME transmits an acknowledgement response message (e.g., DL data Notification ACK message) respective to the reception of the DL data Notification (including EPS bearer ID) message to the S-GW (S1345). Thereafter, before generating the data bearer, the MME may transmit a notification (DL Notification message) to the IWE, wherein the notification notifies the presence of downlink data that are to be transmitted to the idle mode Multi-RAT user equipment (S1350).

The Multi-RAT user equipment is shifted to a RRC-IDLE state and is operated in the WiFi power saving mode, and, herein, by turning on the WiFi transceiver, the Multi-RAT user equipment receive a signal that is periodically broadcasted from the AP (e.g., beacon signal) (S1350). The Multi-RAT user equipment verifies the paging of the beacon, which is transmitted by the AP that was connected to the user equipment. In case the downlink data that are to be transmitted to the idle mode Multi-RAT UE arrive, and in case the IWE decides to transmit this via WiFi, the IWE may transmit a message to the MME, wherein the message (e.g., DL to WiFi request message) requests for the resuming of the WiFi connection of the idle mode Multi-RAT UE (S1360).

The IWE performs a Flow/IP binding update procedure with the P-GW (S1365), and the S-GW re-directs the buffering data and transmits downlink data to the AP (S1370). Thereafter, the idle mode Multi-RAT user equipment receives a beacon signal (including AID, paging) (S1375), enters the awake mode, and may, then, transmit a WiFi awake complete message, which notifies that the WiFi awake is completed, through the AP and to the IWE (S1380). The idle mode Multi-RAT user equipment may receive an acknowledgement response message (e.g., WiFi awake ACK message) with respect to the reception of the WiFi awake complete message from the IWE (S1385).

After entering the WiFi awake mode, the idle mode Multi-RAT user equipment is in a WiFi Connected state, and, then, the idle mode Multi-RAT user equipment may receive the offloaded downlink data from the AP (S1390).

Meanwhile, in case of Scenario 2, the WiFi attach/awake deadline timer may be started starting from a time point when the cellular network (e.g., IWE) decides to perform data offloading. The corresponding WiFi attach/awake deadline timer operates in the network, and a value of the corresponding WiFi attach/awake deadline timer is required to be set to a value after a time period that is sufficient for the cellular network r to redirect data for performing data offloading via WiFi and for the idle mode Multi-RAT UE to receive the beacon signal from the AP/to notify the awake.

Scenario 3: A Case when the WLAN Status of the Idle Mode Multi-RAT User Equipment is in a Power Saving Mode that does not Monitor the Listening Interval FIG. 14 illustrates an exemplary drawing for describing a WiFi paging method in a case when the WLAN status of the idle mode Multi-RAT user equipment is in a power saving mode that does not monitor the listening interval according to Scenario 3.

Figure 14:
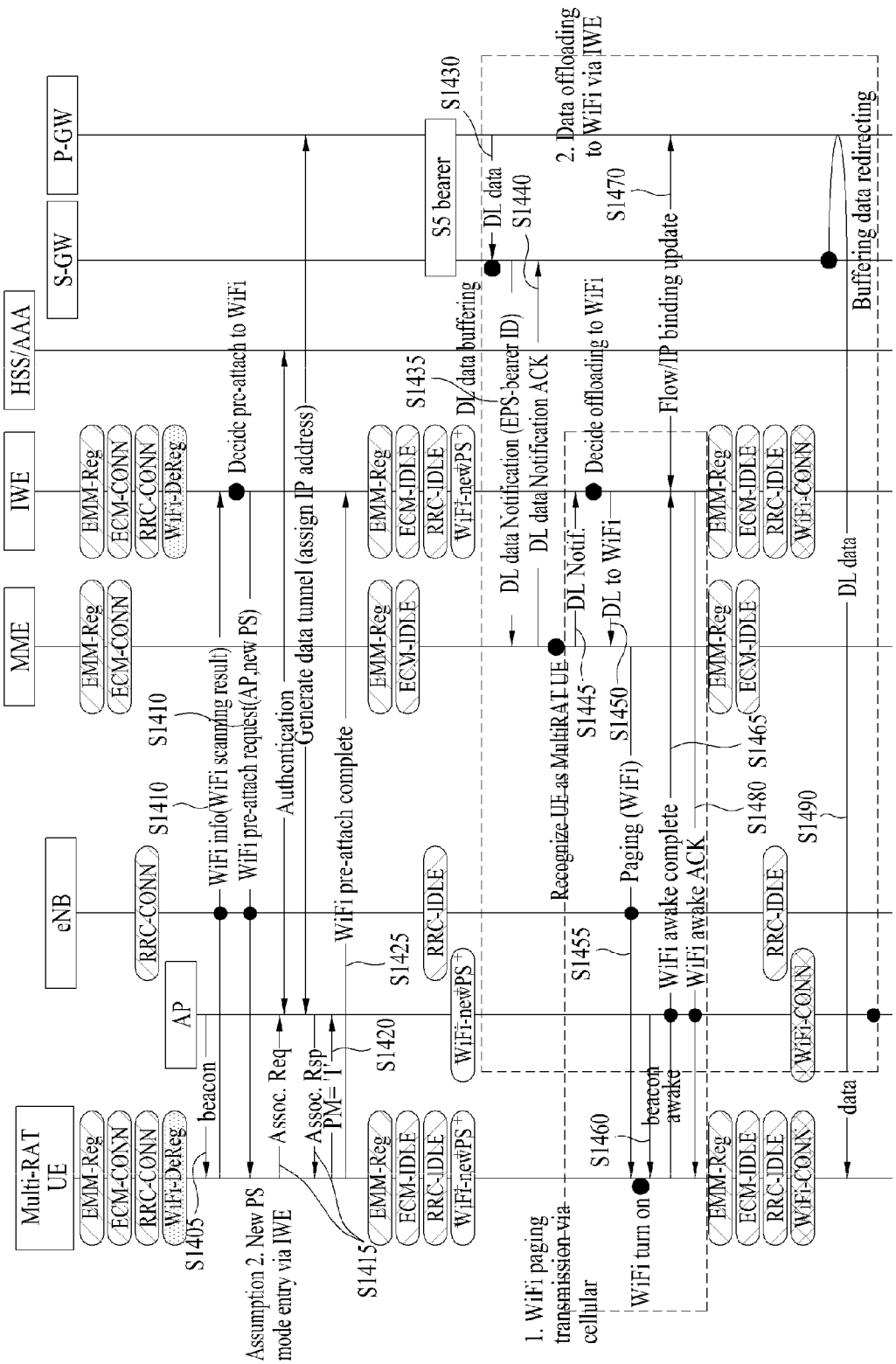
FIG. 14 illustrates an exemplary drawing for describing a WiFi paging method in a case when the WLAN status of the idle mode Multi-RAT user equipment is in a power saving mode that does not monitor the listening interval according to Scenario 3.

Referring to FIG. 14, in case the Multi-RAT user equipment is in a RRC_Connected state with the cellular network, and in case the Multi-RAT user equipment is in a WiFi-Deregistration state (i.e., registration of the WiFi network is canceled and the operation state is in an idle mode), the Multi-RAT UE receives a beacon signal, which corresponds to a signal that is periodically broadcasted, from at least one AP (S1405). The Multi-RAT UE performs WiFi scanning for detecting APs, and, then, the Multi-RAT UE may transmit a WiFi scanning result to the cellular network (e.g., IWE) (S1410). Accordingly, in case the cellular network (e.g., IWE) decides to perform WiFi connection of the Multi-RAT UE in advance (e.g., this may be decided by detecting a preferred AP), the cellular network may transmit a WiFi pre-attach request message instructing the Multi-RAT UE to perform a WiFi pre-attach with the preferred AP (S1415).

Additionally, since the cellular network is aware of the fact that there are no downlink data that are to be transmitted to the Multi-RAT user equipment via WiFi, in case there are no data that are to be transmitted to the Multi-RAT user equipment via WiFi, the cellular network may instruct WiFi pre-attach in order to minimize the power of the Multi-RAT user equipment through the WiFi pre-attach request message, and, then, as soon as the pre-attach is completed, the cellular network may instruct the Multi-RAT user equipment to enter the WiFi power saving mode (S1410). In the present invention, the above-described procedure is referred to as WiFi pre-association of a Multi-RAT user equipment.

Based upon the received WiFi pre-attach request message, the Multi-RAT user equipment performs a procedure of establishing association with the corresponding AP (S1415).

Additionally, in case the Multi-RAT user equipment enters the WiFi power saving mode in accordance with the instruction made by the IWE of the cellular network instructing the WiFi power saving mode entry of the Multi-RAT user equipment, unlike in the conventional method, a procedure of performing the power saving mode without any listening interval is proposed herein. The Multi-RAT user equipment may transmit an indicator (PM=1) notifying the corresponding AP that the user equipment will be entering the WiFi power saving mode (S1420).

After the Multi-RAT user equipment enters the WiFi power saving mode, a WiFi pre-attach complete message may be transmitted to the IWE, wherein the WiFi pre-attach complete message notifies the WiFi pre-attach completion (S1425). The Multi-RAT user equipment operates in the RRC_IDLE state (i.e., operates as an idle mode Mult[i]-RAT user equipment, or operated in a deregistration mode) with the cellular network, and the Multi-RAT user equipment enter the power saving mode in the WiFi. The IWE may identify the fact that, even though the Multi-RAT user equipment establishes WiFi attach, the Multi-RAT user equipment has entered the WiFi power saving mode. When the Mult[i]-RAT user equipment is shifted to the idle mode in both cellular/wireless LAN [networks], the wireless LAN is not monitored, and only the cellular paging panel[channel] is monitored. Herein, even the wireless LAN paging may be instructed through the corresponding cellular paging channel.

In case the downlink data that are to be transmitted to the idle mode Multi-RAT user equipment reach a buffer (S1430), and this is notified by the S-GW to the MME through a DL data Notification (including EPS bearer ID) message (S1435). The MME transmits an acknowledgement response message (e.g., DL data Notification ACK message) respective to the reception of the DL data Notification (including EPS bearer ID) message to the S-GW (S1440). Thereafter, before generating the data bearer, the MME may transmit a notification (DL Notification message) to the IWE, wherein the notification notifies the presence of downlink data that are to be transmitted to the idle mode Multi-RAT user equipment (S1445). In case the IWE has decided to transmit the downlink data, which are to be transmitted to the idle mode user equipment, i.e., in case the IWE decides to perform offloading via WiFi, the IWE notifies the presence of downlink data that are to be transmitted to the idle mode Multi-RAT UE to the MME. In case the downlink data that are to be transmitted to the idle mode Multi-RAT UE arrive, and in case the IWE decides to transmit this via WiFi, the IWE may transmit a message to the MME, wherein the message (e.g., DL to WiFi request message) requests for the resuming of the WiFi connection of the idle mode Multi-RAT UE (S1450).

After receiving the message, which notifies data transmission via WiFi with respect to the idle mode Multi-RAT UE, the MME instructs all eNBs belonging to the tracking area of the idle mode Multi-RAT UE to transmit a WiFi paging message to the corresponding idle mode Multi-RAT UE (S1455). After receiving the instruction from the MME, each of the eNBs transmits a WiFi paging message through a paging channel (PCH) of the corresponding idle mode Multi-RAT UE (S1455).

For the WiFi paging message, the same details described in Scenario 1 of FIG. 12 may be identically applied. In case of Scenario 3, the idle mode Multi-RAT UE receives a beacon signal, which is transmitted by the AP establishing WiFi pre-association (S1460). However, in case of Scenario 3, a value of the corresponding WiFi attach/awake deadline timer is required to be set to a value after a time period that is sufficient for the idle mode Multi-RAT UE to receive the corresponding AP.

In case the idle mode Multi-RAT UE, which used to periodically awake in order to verify its own PCH, receives the WiFi paging message, the idle mode Multi-RAT UE turns on a WiFi transceiver. For the network status, the idle mode Multi-RAT UE maintains the idle mode, and, for the WLAN (WiFi) status, the idle mode Multi-RAT UE shifts to a connected mode. In case of the idle mode Multi-RAT UE having its connection to WiFi successfully completed, the MME determines a location of the idle mode Multi-RAT UE from the IWE, and, then, the MME may newly register the location information of the idle mode Multi-RAT UE. More specifically, an eNB to which the connected AP belongs is registered, and the location of the idle mode Multi-RAT UE may be more accurately managed.

If the idle mode Multi-RAT UE performs the WiFi attach procedure and sends a WiFi attach complete message to the IWE (S1465), the IWE transmits information related to the Flow/IP binding update to the P-GW (S1470), and, as a response to the WiFi attach complete message, the IWE transmits an acknowledgement message (e.g., WiFi attack [attach] complete ACK message) to the idle mode Multi-RAT UE (S1480).

The S-GW performs redirecting on the buffered data and performs data offloading via WiFi through the IWE. More specifically, the idle mode Multi-RAT UE receives the downlink data of the cellular network from the WiFi AP (S1490). More specifically, after recognizing that the WIFI connection of the idle mode Multi-RAT UE has been successfully performed via WiFi, the IWE instructs the downlink data, which were buffered, to be transmitted through the connected WiFi. The idle mode Multi-RAT UE may receive the transmitted downlink data through the connected WiFi.

Also, in Scenario 3, if a WiFi attach/awake complete message is not received until the WiFi attach/awake deadline timer is expired, or, in case, for example, the IWE is unable to receive any verification (or acknowledgement) on the WiFi connection establishment of the idle mode Multi-RAT UE through a network entity, such as P-GW/HSS/AAA, the MME transmits a cellular paging message to the P-GW/HSS/AAA. (More specifically, a service request of the idle mode Multi-RAT UE is guided through a cellular paging transmission respective to a downlink reception.)

As described above, in case the idle mode Multi-RAT UE, which has received WiFi paging, fails to establish connection to WiFi, a connection establishment to a cellular network is attempted. At this point, an Establishment (Service request) Cause may be newly defined in the Service Request/RRC Connection Request message as a "WiFi connection establishment failure" and may, then, be transmitted. After receiving such Service Request/RRC connection request message, the MME and eNB configure a data wireless bearer for transmitting the downlink data transmission, which is transmitted to the idle mode Multi-RAT UE, to the cellular network, and, then, the data transmission is performed to the cellular network.

The message including the corresponding cause ("WiFi connection establishment failure"), which is newly defined, may be transmitted instead of the WiFi attach/awake complete message. If the network does not detect a connection of the idle mode Multi-RAT UE to a wireless LAN (WiFi) for a predetermined period of time, this is considered as a WiFi connection failure.

A process of having the cellular network transmit a WiFi paging message to the idle mode Multi-RAT user equipment is described in FIG. 12 and FIG. 14. And, hereinafter, a detailed method respective to the WiFi paging method will be described in detail with reference to FIG. 15.

Figure 15:
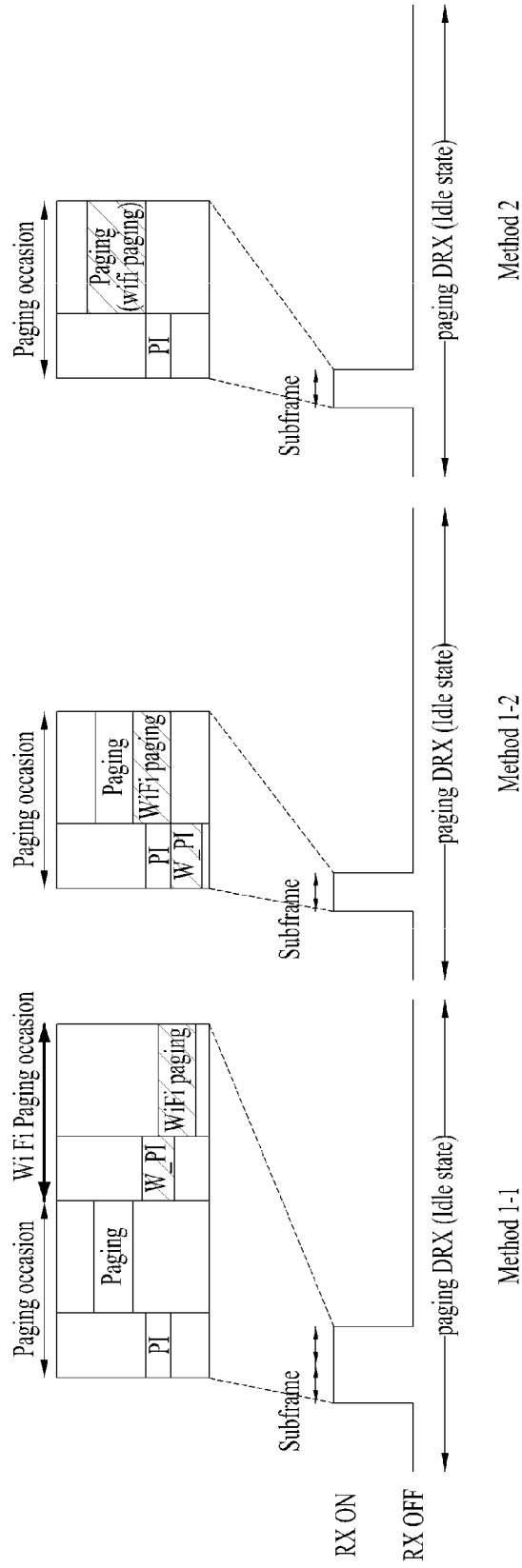
FIG. 15 illustrates an exemplary drawing for describing a method of a cellular network for transmitting a WiFi paging message to the idle mode Multi-RAT user equipment.

FIG. 15 illustrates an exemplary drawing for describing a method of a cellular network for transmitting a WiFi paging message to the idle mode Multi-RAT user equipment.

Referring to FIG. 15, as Method 1, a WiFi paging RNTI may be newly defined. As a detailed example of such Method 1, as shown in Method 1-1 shown in FIG. 15, a WiFi paging occasion is configured separately from a cellular paging occasion, and a WiFi paging RNTI is defined, thereby being capable of transmitting the WiFi paging message.

Additionally, as shown in Method 1-2 shown in FIG. 15, the conventional paging occasion is used and the WiFi paging RNTI is defined, thereby being capable of using the WiFi paging method.

As Method 2, adding a parameter respective to WiFi paging to the conventional paging message is proposed. Herein, the paging occasion on the convention user equipment may be used. However, the user equipment may verify the PDCCH and may then perform paging verification of the WiFi paging through the paging message.

Hereinafter, the above-described method for WiFi paging (Method 1-1, Method 1-2) and Method 2 will be described in detail.

Method 1. WiFi paging RNTI (WP-RNTI) definition

Method 1-1. WiFi paging occasion (PO) configuration+ WP-RNTI definition+WiFi paging message definition First of all, the WiFi PO configuration method will be described.

WiFi PO configuration method 1: It is proposed that the WiFi PO is configured as the subframe immediately following the conventional (or already-existing) paging occasion. The user equipment refers to a DRX parameter that is transmitted from the system information and then calculates the PF/PO respective to cellular paging as shown below.

$$PF: SFN \bmod T = (T \operatorname{div} N)^*(UE\_ID \bmod N) \qquad (1)$$

$$\text{Index } i\_s \text{ pointing to } PO: i\_s = \operatorname{floor}(UE\_ID/N) \bmod Ns \qquad (2)$$

For the definition of the parameters using PF and i_s, reference may be made to Table 1, which is described above.

In case of the Multi-RAT user equipment proposed in the description of the present invention, the unit of a PO in the same PF as the conventional method shall correspond to consecutive subframes (for example, 2 consecutive subframes) and not 1 subframe. More specifically, the user equipment monitors 2 consecutive subframes from the subframe index, which is calculated with respect to the PO, and, then, the user equipment finds a PCH in the first subframe by using a P-RNTI, and the user equipment finds a PCH in the second subframe by using a WiFi paging-RNTI. The network transmits paging by using the first PO when the user equipment wakes for a connection establishment with the cellular network, and, the network transmits WiFi paging by using the second PO when the user equipment wakes for a connection establishment with a secondary system, such as a WiFi network. The user equipment shall be consecutively (or continuously) awake in 2 subframes during one paging DRX interval.

WiFi PO configuration method 2: Definition of a new equation for WiFi PO

The network defines a new WiFi DRX parameter for the WiFi paging of the Multi-RAT user equipment, and, then, the network transmits the newly defined parameter through the system information.

The Multi-RAT user equipment calculates the PF/PO for WiFi paging in addition to the PF/PO for cellular paging, and, then, the Multi-RAT user equipment wakes in each of the respective subframe and verifies whether or not a paging or WiFi paging message being transmitted by using the P-RNTI from the PF/PO for cellular paging and a paging or WiFi paging message being transmitted by using the WiFi paging-RNTI from the PF/PO for WiFi paging. The Multi-RAT user equipment shall be non-consecutively (or non-continuously) awake during one paging DRX interval.

Method 1-2. Usage of already-existing PO+WP-RNTI definition+WiFi paging message definition An already-existing (or conventional) cellular PO is directly used. However, in this case, blind decoding (XOR) respective to the WiFi paging-RNTI is performed one more time as compared to the related art method on the PDCCH, which is being transmitted from the PO subframe, wherein the user is awake in order to verify whether a transmitted cellular paging or WiFi paging message exists. In case of the conventional method, the presence or absence of data is verified through a XOR calculation (or operation) respectively using P-RNTI and S-RNTI. However, in the present invention, the Multi-RAT user equipment is designed to perform the XOR calculation (or operation) one more time by using the WiFi paging-RNTI. Two paging messages (i.e., cellular paging and/or WiFi paging) may be transmitted from one subframe.

Another example for defining the WiFi paging RNTI will be described.

A WiFi paging message may be newly defined, and the following information may be transmitted in the corresponding message.

① UE ID: As an ID of a Multi-RAT user equipment that is being paged, this signifies a connection or paging via WiFi. Herein, one or more UE IDs may be transmitted. The corresponding UE ID may be used as the same UE ID that is used for performing paging in the cellular network, or the corresponding UE ID may correspond to a WiFi related UE ID that is managed by a IWE or an AID in WiFi.

② WiFi related System Information change notification: In the corresponding parameter, in case a WiFi related system information block is newly defined, and in case the corresponding WiFi related SIB change notification is set as an indication, and, when the corresponding indication is set, the Multi-RAT UE shall update the WiFi related system information. This may be used for both connected/idle state Multi-RAT user equipments.

③ Association ID: In case the user equipment corresponds to a Multi-RAT user equipment that has performed pre-association, the Association ID is also transmitted. In case one or more UE IDs are being transmitted, an AID respective each of the paged UE ID may be transmitted.

The Multi-RAT user equipment, which has decoded the PDCCH being transmitted by using the WiFi paging RNTI, receives a WiFi paging message and verifies the presence of a WiFi paging being transmitted to the Multi-RAT user equipment itself. In case a WiFi paging waking the corresponding Multi-RAT user equipment exists, the Multi-RAT user equipment only turns on a WiFi transceiver and may begin (or initiate) WiFi scanning In case the user equipment corresponds to a Multi-RAT user equipment that has performed pre-association, the corresponding Multi-RAT user equipment receives a beacon, which is transmitted from the pre-associated AP, and, then, after verifying its connection status with the AP, the corresponding multi-RAT user equipment performs an awake procedure with the corresponding AP.

In case the user equipment corresponds to a Multi-RAT user equipment having no connection with WiFi, the Multi-RAT user equipment may select one of the detected APs (Herein, the selecting method may correspond to one of APs satisfying an AP selection condition, which is received from the IWE, or may correspond to an AP that is arbitrarily selected by the Multi-RAT user equipment. If the user equipment has received a condition, which is used for selecting the AP, from the IWE, and, in case there is not AP satisfying the corresponding condition, this should be considered as a scanning/association failure), and, then, the Multi-RAT user equipment performs association with the corresponding AP.

Method 2. Adding a parameter respective to WiFi paging to the already-existing paging message The following WiFi paging related parameters may be added to the related art paging message for the Multi-RAT user equipment.

① Cellular/WiFi paging indication (1 bit): field When this field is configured, this signifies a connection or paging via WiFi with respect to the ID of the paged Multi-RAT. If the UE ID is being transmitted without being configured, this signifies paging via cellular. Alternatively, a 2-bit field may be used in order to indicate a cellular paging instruction and a WiFi paging instruction. The corresponding field may be transmitted with respect to one or more UE IDs that may be transmitted in the conventional (or already-existing) cellular paging message.

② WiFi related System Information change notification: In this parameter, in case a WiFi related SIB (system information block) is newly defined, and in case the corresponding WiFi related SIB change notification is set as an indication, and, when the corresponding indication is set, the Multi-RAT UE shall update the WiFi related system information. This may be used for both connected/idle state Multi-RAT user equipments.

③ Association ID: In case the user equipment corresponds to a Multi-RAT user equipment that has performed pre-association, the Association ID is also transmitted. In case one or more UE IDs are being transmitted, an AID respective each of the paged UE ID may be transmitted.

Hereinafter, the data offloading of the idle mode Multi-RAT user equipment via IWE, which is described above with reference to FIG. 12 and FIG. 14, will be described in more detail.

Data link configuration to WiFi

[S-GW↔MME] In case of reaching (or arriving at) a downlink S-GW, which is being transmitted to the idle mode Multi-RAT UE, the S-GW becomes aware that there is no data bearer being connected to the idle mode Multi-RAT UE, and, then, the S-GW transmits a message (including an EPS bearer ID) notifying the arrival of downlink data to the idle mode Multi-RAT UE to the MME. As described above, a DL data notification message (including the EPS-bearer ID) and a DL data notification ACK message are exchanged between the S-GW and the MME.

[MME↔IWE] After receiving the DL data notification message (including the EPS-bearer ID), the MME verifies that the corresponding user equipment is an idle mode Multi-RAT UE, and, then, before configuring the EPS bearer, the MME performs a procedure for deciding whether to transmit the data of the idle mode Multi-RAT UE via WiFi or whether to transmit the data of the idle mode Multi-RAT UE via cellular link with the IWE. A DL data RAT selection request message and a DL data RAT selection response message may be exchanged between the MME and the IWE.

[UE (Idle mode Multi-RAT UE)] Depending on the decision of the IWE, the MME wakes the idle mode Multi-RAT UE. The idle mode Multi-RAT UE configures (or establishes) a connection with a specific RAT (cellular and/or WiFi) in accordance with an instruction transmitted from the network. In case of a cellular paging, a RRC connection establishment is performed, and, in case of a WiFi paging, a WiFi scanning/association or awake procedure is performed.

[IWE↔UE (Idle mode Multi-RAT UE)] After receiving a message notifying that a connection with a specific RAT has been successfully established from the idle mode Multi-RAT UE, the IWE configures (or establishes) a data link for transmitting downlink data to an adequate RAT. A WiFi attach/awake complete message including a WiFi connection result (success/fail), a WiFi IP address, a WiFi attach/awake ACK message, and so on, are exchanged between the IWE and the idle mode Multi-RAT UE.

[IWE↔P-GW]

If a connection to a cellular link is required, a data bearer configuration operation is performed just as in the related art technology. (A case of a WiFi connection failure also corresponds to this case.) If the connection to a WiFi link is successfully established, the downlink data that arrived at the S-GW are required to be re-directed, so that the corresponding downlink data can be transmitted through the AP. The IWE maps an IP address of the corresponding data flow to the IP address of a user equipment, which is assigned through the AP link, by using the P-GW, and, then, the IWE performs a Flow/IP address binding update. After receiving a Flow/IP address binding ACK message, which notifies that the binding update has been successfully performed, from the P-GW, downlink data that were buffered in the S-GW are re-directed so that the downlink data can be transmitted toward the AP.

In case of the above-described Scenarios 1, 3, it is preferable for the IWE to perform binding update only in case of receiving the WiFi attach/awake complete message from the idle mode Multi-RAT UE. In case of Scenario 2, it will be preferable for the IWE to perform binding update immediately after deciding to offload the downlink data via WiFi.

Data offloading of the idle mode Multi-RAT UE through IWE

A message that is to be newly defined for the data offloading of the idle mode Multi-RAT UE will hereinafter be described in detail. The following message may be defined between the IWE and the MME.

DL data RAT selection request message [transmitted from the MME to the IWE]

In case the MME receives a downlink data notification that is being transmitted to the idle mode Multi-RAT UE, the MME transmits to the IWE a request message for deciding the transmitting RAT of the corresponding data to the IWE. The following parameters may be transmitted.

UE ID (IMSI or GUTI or WiFi related ID)
EPS bearer ID of downlink data
QoS related information respective to EPS bearer (subscribed profile information of UE)
  SDF QoS (Quality of Service)
  GBR type SDF QoS parameter: QCI, ARP, GBR(UL/DL), MBR(UL/DL)
  Non-GBR type SDF QoS parameter: QCI, ARP, MBR (UL/DL)
  EPS bearer QoS
  GBR type bearer QoS parameter: QCI, ARP, GBR(UL/DL), MBR(UL/DL)
  Non-GBR type bearer QoS parameter: QCI, ARP, APN-AMBR(UL/DL), UE-AMBR(UL/DL)

If the corresponding information is managed by the IWE, only the EPS bearer ID information, which notifies that the DL data of the specific UE has arrived, may be transmitted.

DL data RAT selection response message [transmitted by the IWE to the MME]

After receiving the DL data RAT selection request message, the IWE may select a RAT, which is to transmit the arrived (or received) downlink data, by using the current network status and information on the idle mode Multi-RAT UE. The following parameters may be transmitted.

UE ID
Transmitting RAT (e.g., WiFi and/or Cellular) of DL data

After receiving the corresponding message, the MME may transmit paging to the UE in accordance with the instruction of the IWE.

The DL data RAT selection response message may also be used with respect to a connected mode Multi-RAT UE and not the idle mode Multi-RAT UE. For example, in case data requesting for a new QoS arrive at the connected mode Multi-RAT UE, and in case a new data bearer is required to be generated accordingly, such message may be transmitted between the MME/eNB and the IWE.

The following messages may be defined between the IWE and the UE.

WiFi attach/awake complete [transmitted by the UE to the IWE]

In case the idle mode Multi-RAT UE completes connection (association) establishment or shifting to awake through a WiFi paging, which is received from the network, the corresponding message may be transmitted to the IWE.

The message that is being transmitted between the IWE and the idle mode Multi-RAT UE may be transmitted through the eNB and may also be transmitted through the AP. However, in case the idle mode Multi-RAT UE, which is defined in the description of the present invention, performs connection establishment to WiFi and WiFi awake, it is preferable that the corresponding message is transmitted through the AP.

In order to perform transmission through the cellular link, a connection establishment of the cellular link should be performed, and shifting to the connected mode should be performed. The following parameters may be included and transmitted.

WiFi connection result (success/fail)
In case the association/scanning is failed, the cause of the failure is notified.
If successful, WiFi IP address, AID After receiving the WiFi attach/awake complete message, the IWE updates Flow/IP binding information through the HA, which managed the IP address respective to the corresponding data flow, for the transmission via WiFi of the downlink data that has arrived to the user equipment.

WiFi attach/awake ACK message [Transmitted by the IWE to the idle mode Multi-RAT UE]

In case the IWE has successfully performed the flow/IP binding update with the P-GW (HA), the IWE transmits a WiFi attach/awake ACK message to the idle mode Multi-RAT UE. The following parameters may be included and transmitted.

UE information, such as UE ID
Shifted data flow information, such as WiFi IP address, AID, EPS bearer ID, and so on
Action time: When binding update is performed, in case an Action time is transmitted, the action time may also be transmitted from the corresponding message. Action time signifies a time point from which the corresponding Flow/IP address binding information starts to be valid in the HA.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

The invention claimed is:

1. A method for performing connection operations with a plurality of communication systems by a user equipment (UE) in a network including the plurality of communication systems interworking with each other, the method comprising:
when the UE is in a radio resource control (RRC) connected state with a first communication system and is in a state of idle mode with a second communication system, receiving a first message including a first indicator and a second indicator from the first communication system, the first indicator instructing the UE to perform association processes with a base station of the second communication system and the second indicator instructing the UE to operate in a power saving mode with the base station of the second communication system,
wherein the power saving mode is defined as a mode in which the UE does not monitor a beacon signal of the base station of the second communication system while maintaining association with the base station of the second communication system,
performing the association processes with the base station of the second communication system based on the first indicator of the first message;
after performing the association processes, switching to an RRC-idle mode state with the first communication system and entering the power saving mode from the idle mode with the second communication system based on the second indicator of the first message;
transmitting a second message to the first communication system, the second message indicating whether the UE successfully performs the association processes and enters the power saving mode; and
after entering the power saving mode, receiving, from the first communication system, a paging message for the second communication system.

2. The method of claim 1, further comprising:
turning-on a mode of the second communication system based upon a reception of the paging message for the second communication system;
receiving a periodic broadcast signal from the base station of the second communication system; and
performing a procedure for maintaining an awake state with the second communication system.

3. The method of claim 2, further comprising:
after completing the procedure for maintaining the awake state, operating in a connected state with the second communication system and maintaining the RRC-idle mode state with the first communication system.

4. The method of claim 3, further comprising:
receiving downlink data of the first communication system from the base station of the second communication system.

5. The method of claim 1, wherein the first communication system corresponds to a cellular communication system, and wherein the second communication system corresponds to a wireless local area network (LAN) communication system.

6. A user equipment (UE) for performing connection operations with a plurality of communication systems in a network including the plurality of communication systems interworking with each other, the UE comprising:
a receiver configured to:
when the UE is in a radio resource control (RRC) connected state with a first communication system and is in a state of idle mode with a second communication system, receive a first message including a first indicator and a second indicator from the first communication system, the first indicator instructing the UE to perform association processes with a base station of the second communication system and the second indicator instructing the UE to operate in a power saving mode with the base station of the second communication system,
wherein the power saving mode is defined as a mode in which the UE does not monitor a beacon signal of the base station of the second communication system while maintaining association with the base station of the second communication system;
a processor configured to:
perform the association processes with the base station of the second communication system based on the first indicator of the first message, and
after performing the association processes, switch to an RRC-idle mode state with the first communication system and enter the power saving mode from the idle mode with the second communication system based on the second indicator of the first message; and
a transmitter configured to:
transmit a second message to the first communication system, the second message indicating whether the UE successfully performs the association processes and enters the power saving mode,
wherein after the UE enters the power saving mode, the receiver is configured to receive, from the first communication system, a paging message for the second communication system.

7. The user equipment of claim 6, wherein the processor is configured to control the UE to turn-on a mode of the second communication system based upon a reception of the paging message for the second communication system, wherein the receiver is configured to receive a periodic broadcast signal from the base station of the second communication system, and wherein the processor is configured to perform a procedure for maintaining an awake state with the second communication system.

8. The user equipment of claim 7, wherein after the procedure for maintaining the awake state is completed, the processor is configured to control the UE to operate in a connected state with the second communication system and to maintain the RRC-idle mode state with the first communication system.

9. The user equipment of claim 8, wherein the receiver is configured to receive downlink data of the first communication system from the base station of the second communication system.

10. The user equipment of claim 6, wherein the first communication system corresponds to a cellular communication system, and wherein the second communication system corresponds to a wireless local area network (LAN) communication system.

* * * * *